United States Patent [19]

Gore et al.

[11] Patent Number: 5,128,878
[45] Date of Patent: Jul. 7, 1992

[54] REMOTE PLOTTING OF INTEGRATED CIRCUIT LAYOUT IN A NETWORK COMPUTER-AIDED DESIGN SYSTEM

[75] Inventors: Brooklin J. Gore, Boise; John D. Mosby, Eagle, both of Id.

[73] Assignee: Micron Technology, Inc, Boise, Id.

[21] Appl. No.: 619,197

[22] Filed: Nov. 28, 1990

[51] Int. Cl.⁵ ............................................. G06K 15/00
[52] U.S. Cl. ................................ 395/162; 364/929.3; 364/DIG. 2
[58] Field of Search ................................ 364/518–520, 364/929.3 MS File, 930 MS File, 940 MS File, 940.62 MS File, 943.4 MS File, 943.5 MS File, 235 MS File, 237.7 MS File, 225.9 MS File, 226.1 MS File, 242.94 MS File, 242.95 MS File, 242.5 MS File, ; 346/154; 400/65

[56] References Cited

U.S. PATENT DOCUMENTS 3,634,828  8/1970  Myers ................... 364/235 MS File
3,684,871  8/1972  Schafner ........................ 364/520

*Primary Examiner*—Arthur G. Evans
*Attorney, Agent, or Firm*—Marger, Johnson, McCollom & Stolowitz, Inc.

[57] ABSTRACT

A remote plotting system and method is implemented in a network of computer workstations whereby a designated computer functions as a plot server. Client workstations are programmed to create plot requests from data created in a computer aided integrated circuit design and layout application. The plot server computer is programmed to A) receive plot requests in a common spooling area sent from other workstations in the network, B) perform necessary rasterization of the requested data, and C) schedule resulting plot files for the first available plotter based on a round robin scheduling mechanism. Plot requests are design file plot templates which are sets of instructions describing the specific characteristics of the desired output, and a reference to the actual design data to be rasterized by the plot server. The system incorporates a single stage queue and supports an unlimited number of plotters and client workstations. The plot server software also monitors progress of requested plots from the point a request is received to the actual printing of the plot file on a particular plotting device.

19 Claims, 8 Drawing Sheets

REMOTE PLOTTING OF INTEGRATED CIRCUIT LAYOUT IN A NETWORK COMPUTER-AIDED DESIGN SYSTEM

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

The invention relates generally to an electronic computer aided design (ECAD) system and more particularly to a system and method for plotting integrated circuit design layouts from multiple computer workstations to one or more hardcopy plotting devices.

In a typical ECAD system, a host computer, commonly called a file server, is connected to a network of other computers each of which is served by a common plotting device usually connected to the file server. These computers, commonly called client workstations, manage the collection of data entered by the user and, among other things, drive the shared plotting device which produces graphical hardcopy output of designs captured by the client workstations.

The most common approach to producing hardcopy output through this combination of client workstation(s), file server and plotting device has been to employ plotting software incorporated into the ECAD system for the process of converting the data, commonly called rasterization; transferring the rasterized output to a spooling area in computer memory ordinarily in the file server; and finally printing the plot on the output device. Typically, the rasterization process is run on each client workstation in a network. The process of rasterizing the data can be very time-consuming. The user must await completion of the rasterization before the client workstation can continue to be utilized for additional design capture or other tasks.

Many ECAD systems employ a multi-tasking operating system such as UNIX®, which allows compute-intensive processes, such as rasterization, to be run simultaneously with other processes. This is commonly referred to as background processing. Background processing at least allows the user to continue other computer tasks. Yet, despite this ability, rasterization can still require so much computer resources that response time for the user performing other computer-based tasks is unacceptable.

A typical example can be illustrated by considering the popular integrated circuit ECAD system from Cadence Inc. called the Cadence Design System. This system shown in block diagram form in FIG. 1 and in a data flow diagram in FIG. 2, utilizes the UNIX® operating system for multiple processing, and employs a network of client workstations, a file server and one or more plotting devices. Each client workstation performs the rasterization process for each hardcopy plot request. Once completed, the rasterized file is sent either to a locally connected plotting device, or across the network to a file server and then to a plotting device for output.

Response time in this environment is nearly unacceptable because the rasterization process is run on the client workstation despite the fact that the UNIX® operating system provides for running the rasterization process simultaneous to other tasks, such as capturing additional design work in the integrated circuit layout editor. As a result, the client workstation user cannot make productive use of the workstation during rasterization processing. This results in increased turn-around time for circuit design layouts and higher costs.

Accordingly, a need remains for an improved method and system for rasterizing, spooling and plotting graphical hardcopy of integrated circuit designs captured on client workstations which would allow the user to continue other tasks while the time and resource consuming processes of rasterization and hardcopy plotting run uninterrupted.

SUMMARY OF THE INVENTION

One object of the invention is to provide an improved method and system for rasterizing, spooling, and printing plots of circuit designs created with a computer aided design system.

A second object of the invention is to minimize lost productivity caused by time-consuming plot rasterization that renders a client workstation unusable until the rasterization is complete.

Another object of the invention is to support multiple ECAD workstations and multiple output devices in a networked configuration such that the first available output device produces the next-available rasterized plot from any client workstation.

Additional objects of the invention as aforementioned are to automatically queue plots as they are requested and to inform users on the workstation network of the current status of the requested plot jobs.

The invention provides a method and system of multiple client workstations on a common computer network to queue plot jobs from client workstations to a plurality of output devices. The system includes a client workstation with a graphical display, a first programmable computer configured to function as a file server, a second programmable computer to function as a plot server, and a plotting device connected to the plot server, the workstation and computers being interconnected via a computer network. The workstation, file server and the plot server each have a memory, a processor, a network interface, and an input means including a user-operable means for entering data. The plot server is programmed with software which enables the user to generate plot output without interrupting work proceeding on the client workstation from which the plot is originally requested. The plot server may also encompass a raster server as well to specifically handle rasterization of data while the plot server administrates the plot submissions, plotter queues, and print spooling.

So programmed, the system includes software resident on client workstations for integrated circuit design; software resident on client workstations for creating and submitting the new integrated circuit schematic or layout data file together with plot instructions, resulting in a file called a design file plot template, from currently displayed layout designs or from existing stored plot templates; software resident on plot servers for receiving design file plot templates, initiating the rasterization process and monitoring progress; and preferably, software for monitoring progress of the plotter queue. The design file plot template is a computer file of data comprising A) a reference pointer to the actual design file data and B) plotting instructions which describe the characteristics of the desired plot output, such as visible layers of the design to be plotted, scale, and page orientation. The rasterization software is that portion of the integrated circuit ECAD system which translates circuit design data to a format for plotting to paper or vellum on a plotting device. The rasterization software could also reside on yet another computer called a raster server.

The foregoing and additional objects, features, and advantages of the present invention will be more readily apparent from the following detailed description of a preferred embodiment which proceeds with reference to the accompanying drawings.

APPENDIX A is a printout of the Rplot software used in the present invention.

APPENDIX B is a printout of the Rplot.cj software used in the present invention.

APPENDICES C and D are printouts of the Plots software used in the present invention.

DETAILED DESCRIPTION

This description begins with a general description of a prior art system, followed by a description of the hardware and software structure as used for creation, transfer, and spooling of plot files from a workstation to a plot server in accordance with the invention. Then the operation of the system is described from the user's viewpoint.

Occasional references are made to UNIX ® manual pages for detailed references on a certain feature or attribute of the art. We assume the 8-section format used by both 4.3 BSD Berkeley 1986a, 1986b, 1986c]and System V [AT&T 1989b]UNIX versions. References of the form "cron(8)" refer to the entry for cron in Section 8 of the UNIX ® 4.3 BSD manuals. See generally, The UNIX 4.3 BSD Manual Set, University of California Berkeley Computer Science Research Group, USENIX Association 2560 9th St., Ste. 215, Berkeley, California 94710

A glossary of terminology used herein appears at the end of the detailed description.

General Prior Art System

Figure 1:
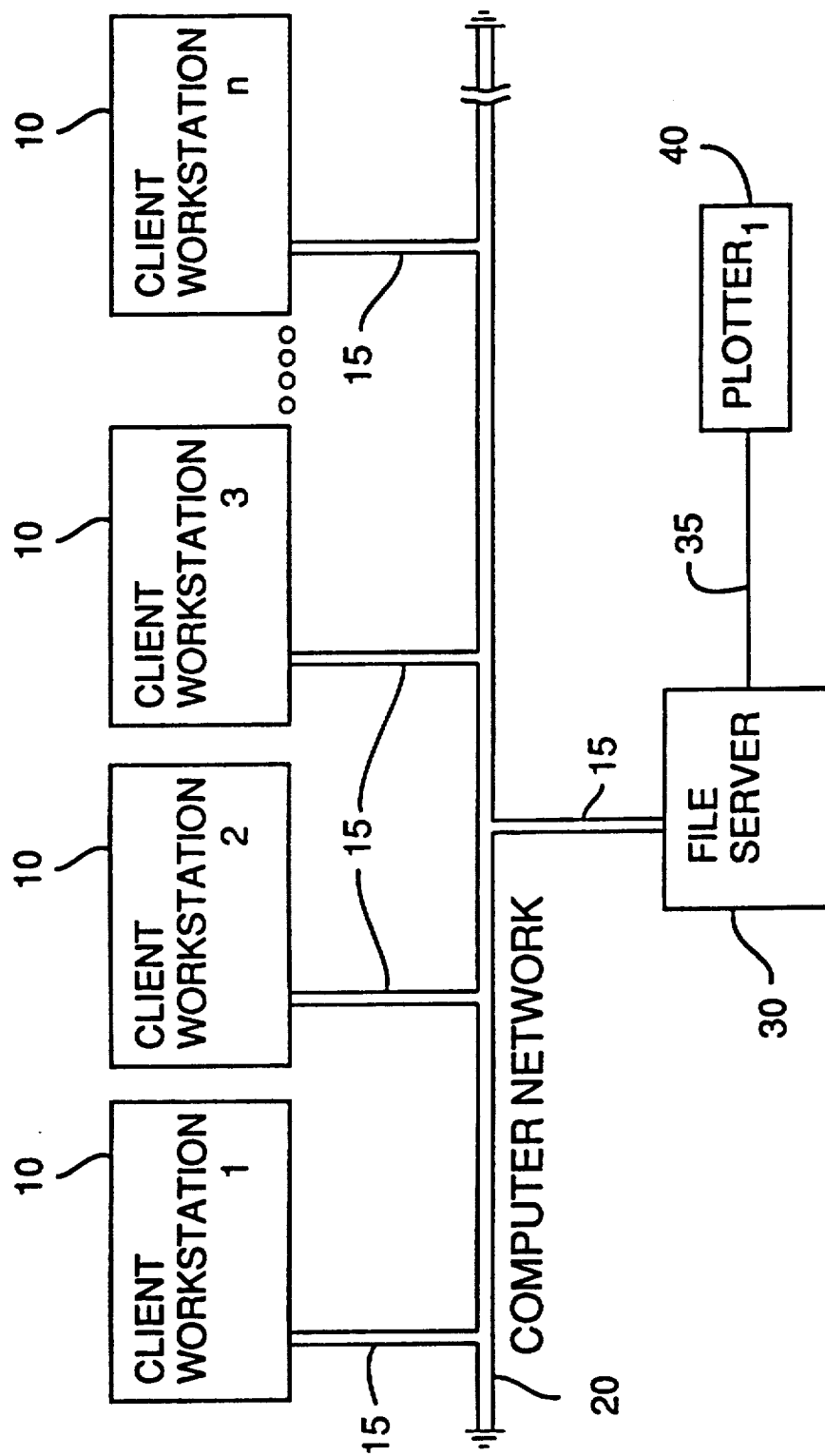
FIG. 1 is a block diagram of the prior art system architecture for an integrated circuit ECAD system.

Referring to FIG. 1, a series of computer workstations 10 are connected to a computer network 20 to provide a typical computer aided design system. Computer network 20 typically comprises IEEE-802 coax cable. Computer workstation 10 comprises a general purpose 32 bit digital computer conventionally including a central processor, random access and hard disk memory (not shown), and a network interface. The network interface 15 comprises an interface card for the computer workstation, Xerox ® Ethernet ® cabling, and an interface tap connected to the computer network cable. A user interacts with the workstation through a graphic display means including a video display unit, a keyboard and a mouse (not shown). A suitable form of workstation is provided by the commercially-available Sun Microsystems 3 or 4 series computer system.

Typically, one workstation is designated as a file server. File server 30 comprises a general purpose 32 bit digital computer conventionally including a central processor random access and hard disk memory (not shown), and network interface 15. The hard disk memory is typically significantly larger than the hard disk memory available on the workstation. Additionally, the file server includes one or more ports 35 to connect output plotting devices 40.

Figure 2:
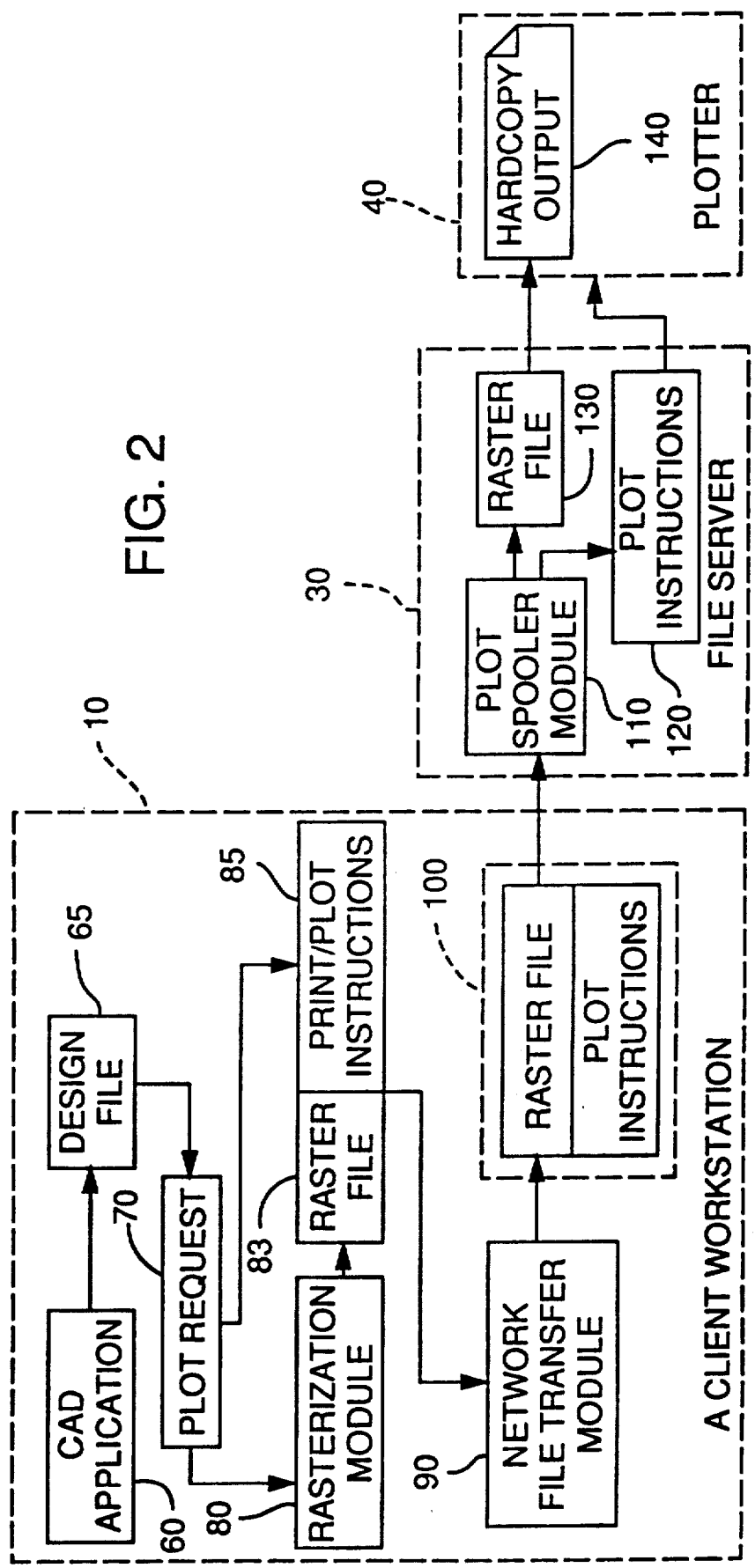
FIG. 2 is a control flow diagram of the prior art for plotting integrated circuit layout designs on a plotting device.

Referring to the data flow diagram of FIG. 2, the user of workstation 10 in the system of FIG. 1 employs an ECAD application 60 to prepare an integrated circuit design file 65. Then, the user uses the plot request software 70 to request plotting of the design on the plotter 40 attached to the file server 30, accessible via the computer network. The design file must be converted to data suitable for plotting using rasterization software 80. The resulting raster file 83 is combined with plotting instructions 85 received from plot request software 70. This resulting plot file 100 is transferred by a network file transfer software module 90 over the network to the file server 30, where it is received by a plot spooler module 110.

The network file transfer module 90 is activated by the plot request module 70 in the process of specifying a plotting device. If the specified plotting device is not locally attached to the workstation, which it seldom is, then the network file transfer module is invoked to transfer the plot file 100 to the file server 30 where the specified plotting device is attached.

Plot instructions 120 received in the plot file 100 are used to select the specific plotter device and paper size. The received raster file 130 is subsequently plotted on the plotter device 40, resulting in hardcopy output 140.

Hardware and Software Structure of Preferred Embodiment

Figure 3:
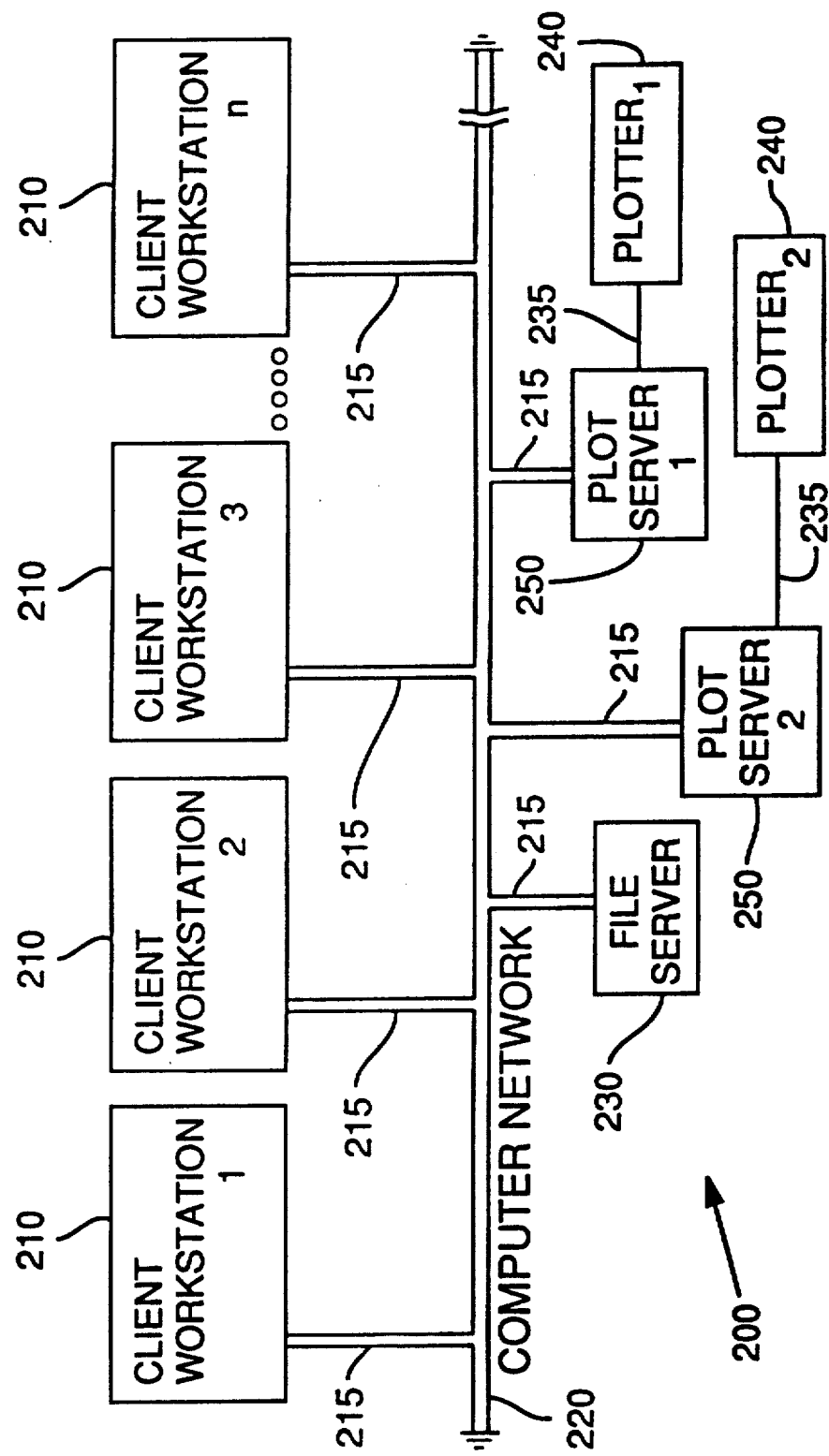
FIG. 3 is a block diagram of the new system architecture for an integrated circuit ECAD system in accordance with the invention.

Referring to FIG. 3, a series of client workstations 210 are connected via network interface 215 to a computer network 220 to provide an electronic computer aided design (ECAD) system 200 configured according to the invention. Computer network 220 comprises IEEE-802 coax cable. Client workstation 210 comprises a general purpose 32 bit digital computer conventionally including a central processor, random access and hard disk memory (not shown), and network interface 215. The network interface comprises an interface card for the computer workstation, Xerox ® Ethernet ® cabling, and an interface tap connected to the computer network cable.

The system 200 includes a computer 230 functioning as a file server. File server 230 comprises a general purpose 32 bit digital computer including a central processor, at least 32 megabytes of random access memory (RAM), at least 892 megabytes of hard disk memory (not shown), and a network interface 215. A suitable form of file server is provided by the commercially available Sun ® Microsystems 4/260 series computer system.

The system 200 also includes a computer 250 configured to function as a plot server. Plot server 250 comprises a general purpose 32 bit digital computer including a central processor, at least 96 megabytes of random access memory (RAM), at least 688 megabytes of hard disk memory (not shown), and a network interface 215. A suitable form of plot server is provided by the commercially available Sun ® Microsystems 4/260 series computer system. The plot server is also configured with a minimum of one, and maximum of two plotting device controller boards (not shown) using a parallel interface 235. A suitable form of plotting device controller is provided by a Versatec ® controller board commercially available from Versatec ® Corporation. At least one plotting device 240 is connected to the plot server 250 via parallel interface 235. A suitable plotting device is provided by the Versatec ® Color Electrostatic Plotter, commercially available from Versatec ® Corporation.

In an alternative embodiment, an additional computer called a raster server (not shown) could be added to further distribute processing by off-loading certain processing responsibilities from the plot server. In this configuration, a suitable raster server is provided by the commercially available Sun ® Microsystems 4/260 series or Sun ® SPARC ® series computer systems.

Figure 4:
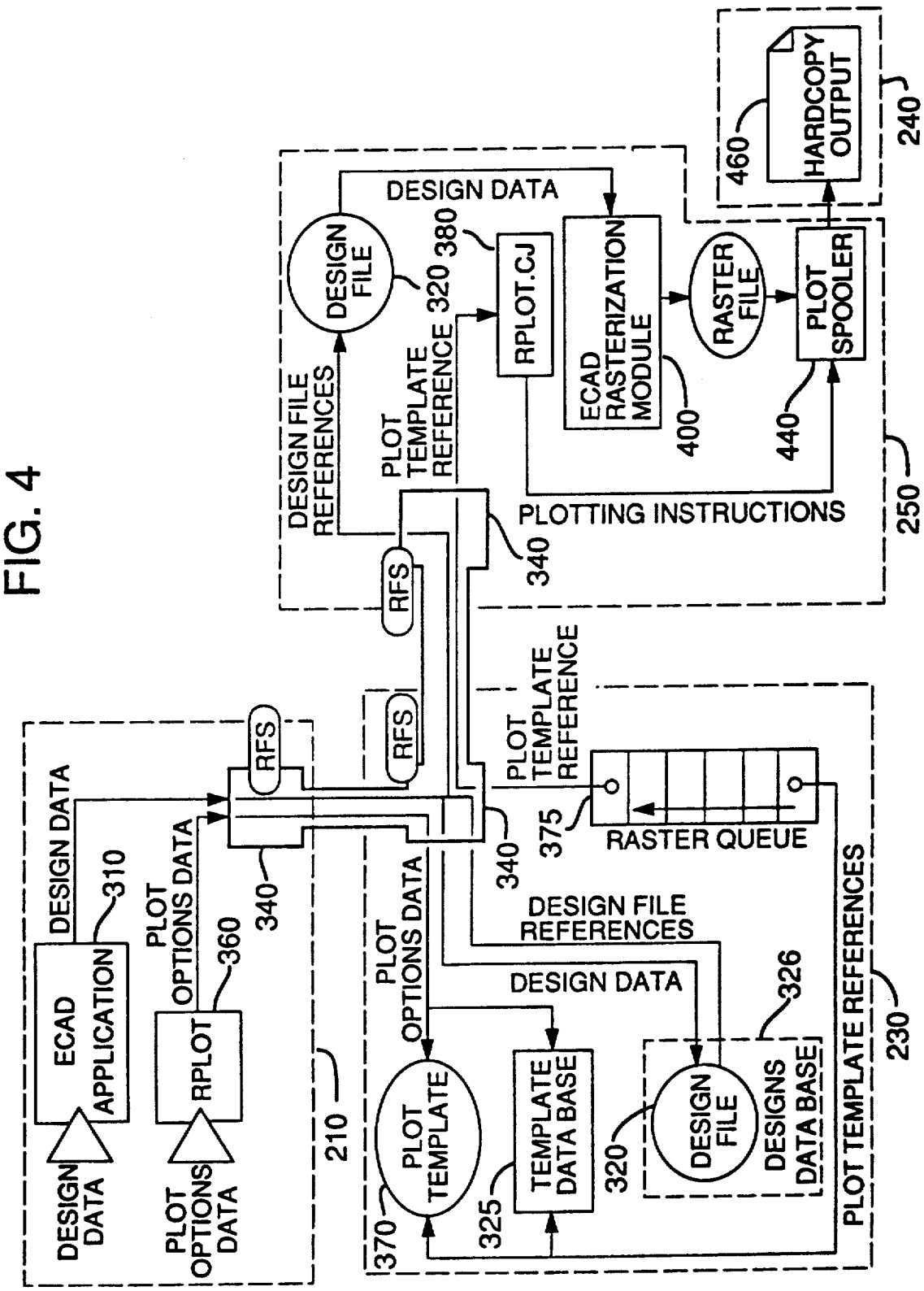
FIG. 4 is a control flow diagram for plotting integrated circuit layout designs in accordance with the invention.

Referring to FIG. 4, the computer network 220 shown in FIG. 3 is managed by remote file access system (RFS) software 340 resident in system 200, on each client workstation 210, file server 230, and plot server 250. ECAD application software 310, such as the Cadence Inc. Edge ® product, is used in workstation 210 to create a design file 320 containing the schematic level design and the layout design for an integrated circuit which design data are stored in file server 230. Novel software identified as Rplot 360 (see Appendix A) generates a design file plot template 370, which is likewise stored in file server 230 in template queue 375 and optionally in template database 325 for future use.

RFS software 340 residing on each computer implements a "remote file access system" to provide transparent remote access to file systems on hard disks attached to each of the client workstations, file server, and plot server in the system 200 of FIG. 3. Remote file access systems provide file sharing between remote workstations on a heterogeneous network. Remote machines' file systems (e.g., portions of hard disks) are "mounted" (see glossary, Mounting File Systems) locally, appearing as if they are physically attached to a user's own workstation. A suitable remote file access system is provided by NFS ® which is commercially available from Sun Microsystems, Inc. with the purchase of their workstation products. Remote file access system application level protocol specifications are available in the public domain. The remote file access protocol is implemented using another public domain protocol, "Remote Procedure Call" (RPC; see glossary, Remote Procedure Calls). The basic idea behind a remote procedure call is to provide access to remote network services at the level of programming language function calls. In this way, although a program issues a simple function call, in fact, it is actually requesting a server on another physical machine to perform some service.

Figure 11:
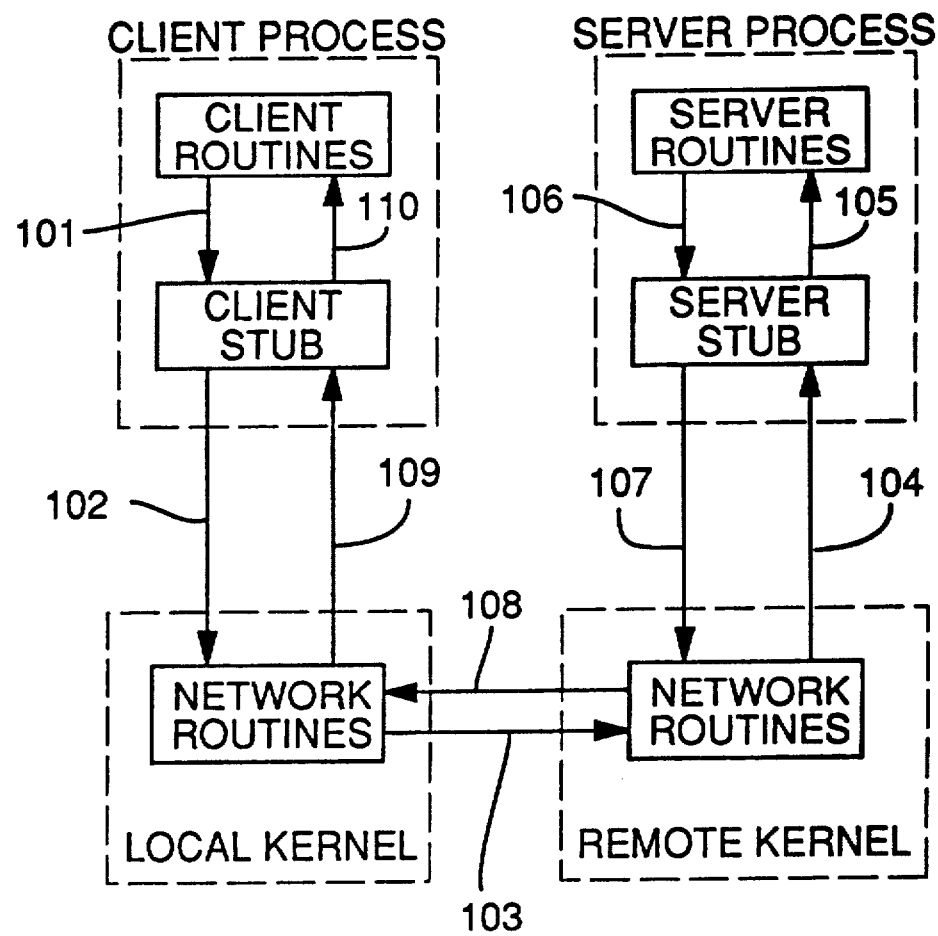
FIG. 11 in the Glossary of Terminology appearing at the end of the Detailed Description is a control flow diagram illustrating the Remote Procedure Calling mechanism used to implement Remote Access File Systems.

Referring to FIG. 11, in summary, RPC functions as follows: A user runs a program, called a client program on a client workstation. The upper levels of the program have no notion that a computer network is involved; lower level routines are simply called to complete the task. One or more of these low level routines, however, are called "stubs." A stub does not actually contain code to perform the function which its caller has requested. Instead, the stub translates all of its arguments (passed by the function call) into a form suitable for network transmission called a message, then establishes contact with a server program on the same or some other workstation, and sends the arguments to the server. The server converts the request and arguments into a locally useful form, runs the requested service, packages the results, and sends them back to the client. The client, in turn, translates the results into a form it can use, and returns to the calling routine. Therefore, it should be readily apparent how a remote file access system can be implemented using remote procedure calling. The remote procedure calling protocol is in the public domain and can be obtained from UUNET (a worldwide accessible UNIX network service) or from the Sun-Spots Archives available on titan.rice.edu (a computer readable data archive of publicly available software and system specifications stored on the publicly accessible USENET machine "titan" using the above listed USENET electronic mail address and a UNIX request program known as "anonymous ftp.")

As stated, RFS software 340 facilitates remote access by all client workstations to disk space located on the file server. This facility provides a means for accessing the design file plot template 370 generated by Rplot 360 on the file server 230 via network 220, and for subsequent access by the plot server 250.

Rplot 360 comprises a novel utility for creating a design file plot template 370. The design file plot template is composed of instructions used to specify characteristics of the final hardcopy output including (but not limited to) paper size, layers of the design file to be plotted, scale, and page orientation. The design file plot template contains a "pointer" to reference the actual data of design file 320 stored in design file database 325 in the file server. Resident on plot server 250 is software identified as Rplot.cj 380, which periodically polls the file server 230 for the presence of a design file plot template 370 waiting in template raster queue 375 for rasterization by ECAD rasterization module 400, also resident in the plot server. Rplot.cj 380 is a UNIX ® shell program (see APPENDIX B) which employs the UNIX ® "cron" utility (not shown) to periodically check the file server for a design file plot template. On finding a design file plot template 370, the Rplot.cj module verifies that a plotter 240 is available; verifies that enough disk memory is available for rasterizing; and moves the design file plot template from the file server to the plot server. The Rplot.cj module next invokes the rasterization module 400 and, using the design file plot template data, proceeds to rasterize the design stored in the design file database 325 and referenced by the design file plot template.

In an alternative embodiment, an additional server, called a raster server (not shown), is similarly employed on the network to manage all rasterization processing, thereby further distributing the processing responsibilities and accordingly improving the overall performance of the system still more. In this configuration, Rplot.cj transfers the design file plot template from the file server to the plot server. The Rplot.cj module next invokes the rasterization module 400 on the raster server and, using the design file plot template data, proceeds to rasterize the layout design stored in the design file database 325 and referenced by the design file plot template on the raster server.

A completed rasterization results in raster file 420. While the resulting raster file 420 is created, the Rplot.cj module utilizes the template plotting instructions to determine the number of copies to plot, whether the plots are to be monochrome or color, and how much paper will be required to complete the plot(s). Once the rasterization process is complete, the Rplot.cj module transfers the raster file 420 with the plotting instructions to a plot spooler 440 (e.g., the UNIX ® "lpr" facility) for actual printing on the plotting device 240. This results in a hardcopy output 460.

In the alternative embodiment employing the raster server, once the raster server has finished rasterizing the design data, the raster file 420 is transferred back to the plot server for subsequent queuing to the plot spooler 440.

System Operation

Users create IC design files 320 using ECAD application software 310. A suitable form of ECAD application is provided by the commercially available Cadence Inc.'s Edge ® product. The resulting design file is stored in a design file database 325 on a file server 230 for subsequent design data capture, or is prepared for plotting on an electrostatic plotting device 240 served by plot server 250 on the ECAD system network 220.

Preparation of a plot requires the user to run either Rplot 360 to build a design file plot template, or Rtplot (not shown) to utilize an existing design file plot template. In the following descriptions, refer generally to Appendix A and B.

Creating a New Design File Plot Template

Figure 5:
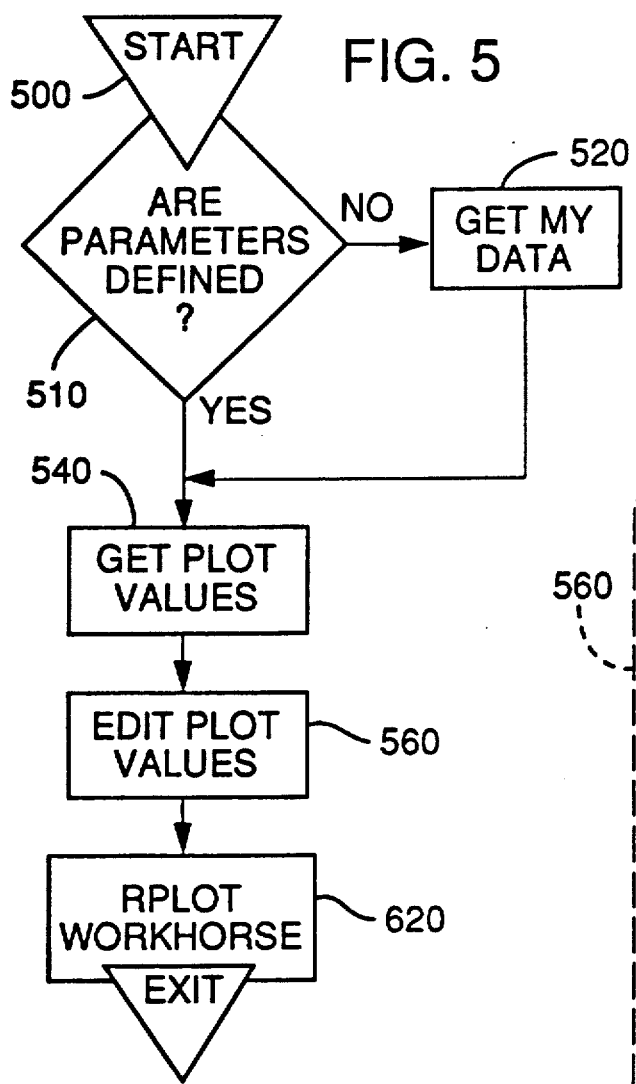
FIG. 5 is a control flow diagram illustrating the operation of the main Rplot routine to create a design file plot template.

FIG. 5 is a control flow diagram illustrating the operation of the system to create a design file plot template when a design file has never been plotted, or there is no known existing plot template file in the template database. Operation is begun from step 500 when the user selects the Rplot command (see also Appendix A) on a pop-up menu that appears on the client workstation display.

When the Rplot command has been selected for the first time, the operation first proceeds to step 520 ("getMyData," discussed infra) to initialize directory search paths which facilitate locating various data files. All subsequent invocations of Rplot will proceed directly to step 540 ("getPlotValues") as step 520 defines certain user session parameters at step 510 that never need redefinition during a user session. In this context, a user session is taken to mean the period of time the user is "logged in" to their client workstation and using the ECAD application.

Step 520 involves setting internal variables to standard UNIX path values for the current "working" directory, the user's "home" directory, and the user's "identification" (sometimes referred to as a unique ID, or "UID"). The operation next proceeds to step 540 ("getPlotValues") where the size of the plot is obtained according to the size of the current viewport on the workstation display, and the current magnification value of the viewport. The viewport is that portion of normalized device coordinate space currently displayed on the client workstation. A good method of visualizing what this means is to use the analogy of a camera focused on the entire normalized device coordinate space. The client workstation display focuses on a specific portion of the complete space and can "zoom in" or "zoom out" on that space (where zoom-in and zoom-out address the value of magnification). Thus, the portion of an IC layout data file viewed on the workstation display depends on the current viewport and the degree of magnification of that viewport. This value can be anything from the entire contents of the data file down to the maximum allowed magnification (i.e., a single integrated circuit cell within an entire design). These values are established in step 540 so the output plot represents the visible portion of the data file currently displayed on the client workstation at the creation time of the design file plot template.

Figure 6:
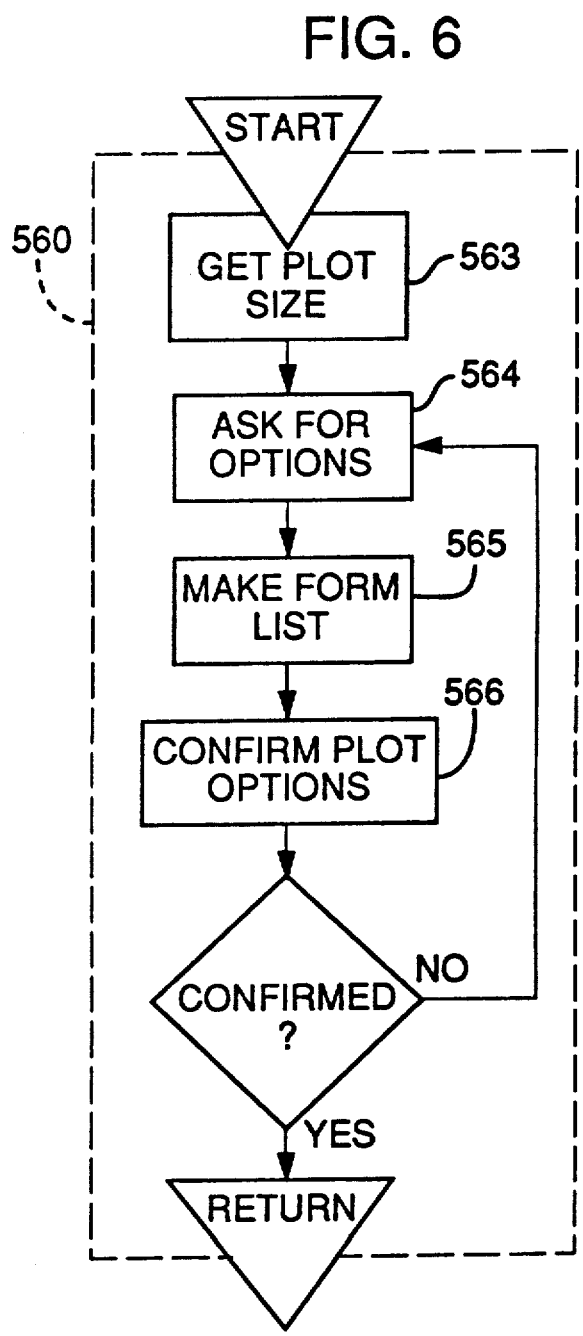
FIG. 6 is a control flow diagram for a subroutine of FIG. 5 that engages editing of the design file plot template values.

Following collection of this initial data, the operation proceeds to step 560, ("editPlotValues") where the actual plot template is created. Referring now to FIG. 6, first, the size of the plot is displayed at the top of the workstation display according to step 563 ("getPlotSize"). Second, a display oriented data fill form is created in step 564 ("askForOptions"). The fill form is constructed by creating a window on the workstation display in which the following entries are listed pursuant to step 565 ("makeFormList"):

ABORT?
plotTemplate
blockName
representationName
askForPoints?
lowerLeftWindowCoordinates
upperLeftWindowCoordinates
magnification
plotMosiacBordersOnly?
layersRevision
blockPath
plotter
numberOfCopies
UserUnitsPerMicron (layer file)
dbUnitsPerUserUnit (layer file)

Where initial values have already been obtained (e.g., the plot size), those values are listed adjacent their entry to the right of the equal-sign (=). If the user desires, the finished size of the plot can be altered by selecting (a selection method is explained infra) the entries "lowerLeftWindowCoordinates," and "upperLeftWindowCoordinates," and entering new values. The new values are shown inside the fill form window next to their appropriate label, and at the top of this window. If these new values are outside a legal range, creating a skewed aspect ratio, the system automatically adjusts the plot size in the x or y direction as appropriate, and informs the user with a message at the top of the fill form window.

The user sets plot options by entering required data in the fill form window by means of a selection service such as a mouse pointing device or cursor keys, and the keyboard. In a preferred embodiment, the selection service is a three button mouse. As the user drags the mouse on a mouse pad, a corresponding pointer glyph moves across fields in the fill form. As the glyph touches a field, the field is highlighted (placed in reverse-video). Once the field is highlighted, the user can drag the mouse-pointer over to the value space in the field and begin entering new data via the keyboard. Where values are boolean in nature (e.g., "on" vs. "off"), a click (press and release) of the middle mouse button will toggle the value. If the entry can be any of a number of values, a pop-up menu will appear as the mouse-pointer is dragged across the value space.

The operation continues to loop in routine 564 ("askForOptions") until the user clicks any mouse button at a point anywhere outside the fill form window. On this event, the operation proceeds to step 66 ("confirmPlotOptions") where a new window appears displaying four options to the user, ABORT, SUBMIT, SAVE, or DISPLAY INPUT FORM. When the user selects SUBMIT and/or SAVE, the operation proceeds to step 620 ("rplotWorkHorse") in FIG. 5 to write the template file to a permanent file depending on whether the SAVE option was selected in addition to the SUBMIT option.

Figure 7:
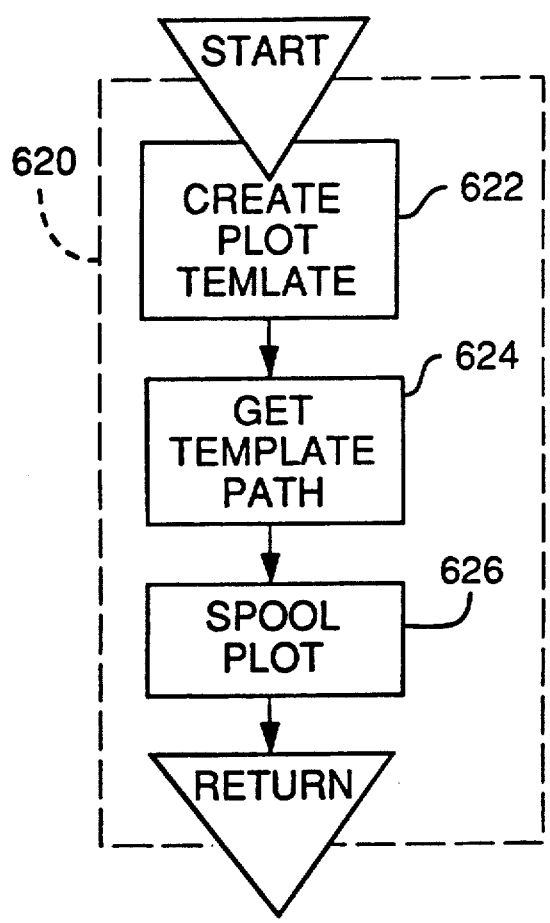
FIG. 7 is a control flow diagram for a subroutine of FIG. 5 to create a design file plot template.

Referring now to FIG. 7, step 622 ("createPlotTemplate") is called to actually create the physical data file known as the "design file plot template." This file will later serve as a commands file to drive the ECAD system's rasterization process on the plot server. The operation next proceeds to step 624 ("getTemplatePath") at which point the plot characteristic data file is actually written to a directory location somewhere within the network file system as implemented by the remote access file system, and previously defined according to the user's environment definition. Finally, step 626 ("spoolPlot") is called to actually spool the design file plot template to the raster queue for subsequent processing.

Using Pre-Existing Plot Templates

If a design file plot template already exists in a template database 325 (shown in FIG. 4) on the file server with the desired plotting instructions, then the user selects the Rtplot command (see also Appendix A) from a pop-up menu that appears on the client workstation's display.

Figure 8:
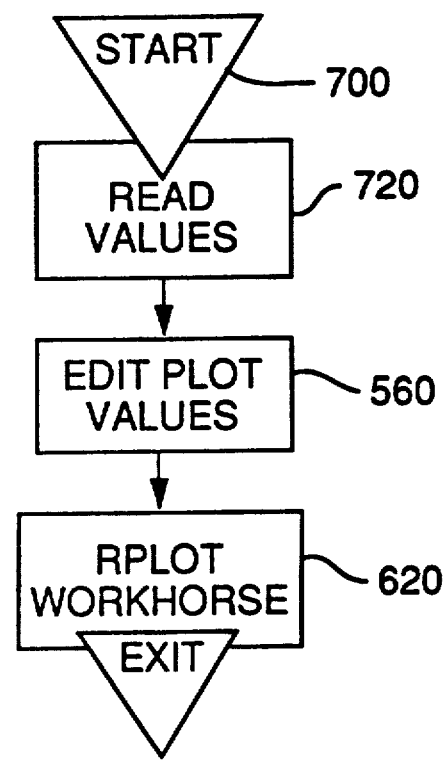
FIG. 8 is a control flow diagram illustrating the operation of the main Rtplot routine to edit existing design file plot templates.

FIG. 8 is a flow diagram illustrating the operation of the system to edit and submit an existing design file plot template where a design file plot template has previously been created (Rtplot). Operation starts from step 700 when the user selects the Rtplot command on a pop-up menu that appears on the client workstation display. Step 720 ("readValues") is invoked to access the user defined template file and load the template into the fill form. Next, control passes to subroutine 560 ("editPlotValues") to allow the user to modify any of the template values.

Referring back to FIG. 6, first, the size of the plot is displayed at the top of the workstation display according to step 563 ("getPlotSize"). Second, a display oriented data fill form is created in step 564 ("askForOptions"). The fill form is constructed by creating a window on the workstation display in which entries (described earlier for Rplot) are listed pursuant to step 565 ("makeFormList") Since the values already exist, they are listed adjacent their entry-label, to the right of the equal sign (=).

The user modifies options by entering new data in the form on the display by means of a selection service such as a three button mouse and the keyboard, in a method discussed earlier for Rplot. The operation continues to loop in routine 564 ("askForOptions") until the user has entered or passed on each entry in the list, and selected any point outside the fill form window with a mouse button click. On that event, the operation proceeds to step 566 ("confirmPlotOptions") where a new window appears displaying four options to the user, ABORT, SUBMIT, SAVE, or DISPLAY INPUT FORM, as discussed earlier. When the user selects SUBMIT and/or SAVE, the operation of Rtplot routine (FIG. 8) proceeds to subroutine 620 ("rplotWorkHorse") to rewrite the template file to the permanent file depending on whether the SAVE option was selected in addition to the SUBMIT option.

Referring back to FIG. 7, step 622 ("createPlotTemplate") is called to actually create the physical data file known as the design file plot template. This file will later serve as a commands file to drive the ECAD system's rasterization process on the plot server. The operation next proceeds to step 624 ("getTemplatePath") at which point the plot characteristic data file is actually written to a directory location somewhere within the network file system as implemented by the remote access file system, and previously defined according to the user's environment definition. Finally, step 626 ("spoolPlot") is called to actually spool the design file plot template to the raster queue for subsequent processing.

The Plot Submission Process

Referring back to FIG. 4, the Rplot.cj utility 380, (see also Appendix B) located on the plot server 250, periodically inspects the file server 230 for the existence of a design file plot template in the template raster queue. Periodic inspection is conducted using the standard "cron" facility (not shown) in UNIX.

The standard System V and Berkeley Standard Distribution (BSD) UNIX "cron" program provide a facility for executing operating system commands and other programs at specified dates and times. Regularly scheduled commands can be specified according to instructions found in the standard UNIX "crontab" files in the 4.0 UNIX directory "/var/spool/cron/crontabs." The "cron" program examines "crontab" files when it is first started (typically during boot-up of UNIX) or when a file using "crontab" changes. In other words, once "cron" is started, it never exits.

The "crontab" file is a table of times to run periodic jobs (other operating system commands or programs). Each line in a "crontab" file consists of fields which define the minutes, hours, days of the week and month, months of the year, and the name of the command or program to run. Details on implementing "cron jobs" can be found in any set of System V or BSD UNIX System Manuals under the reference entry crontab(5), with additional detail and cross references under cron(8), rc(8), sh(1), init(8), syslogd(8), and crontab(1).

In this network configuration, the Rplot.cj utility supports any number of plot servers because one copy of Rplot.cj resides on each plot server. Therefore, each plot server separately and independently polls the file server for the existence of design file plot templates in the template raster queue. For this reason, to avoid a race condition where more than one plot server is attempting to retrieve a design file plot template, no two Rplot.cj programs should ever run simultaneously on the network. In other words, since each plot server "cron" facility periodically activates that server's copy of Rplot.cj, each server must schedule the running of its own Rplot.cj to avoid a race condition when polling the file server template raster queue. If there is only one plot server on the network, there is no chance for a race condition. If, however, there are two plot servers on the network, then Rplot.cj on the first server must be run, for example, once every even minute on the even minute, while the second Rplot.cj is run once every odd minute on the odd minute. Likewise, if there are three servers, each server starts its copy of Rplot.cj every three minutes; server one on minutes 1, 4, 7, and so on; server two on minutes 2, 5, 8, and so on; and server three on minutes 3, 6, 9, and so on. Each "cron" utility's "crontab" table should have an entry specifying the minutes of an hour that Rplot.cj should be started.

In this manner, no two plotters will ever attempt to retrieve the same plot template. Instead, server one will retrieve the first template in the queue, server two will retrieve the second template in the queue, and so on. Accordingly, as a standard practice, the resulting output and error messages (commonly referred to as "stdout" and "stderr") from the Rplot.cj (commonly referred to as the "cron job") should be redirected to a log file.

Sometimes a plot will take longer to complete than the interval between revival of Rplot.cj by "cron." Therefore, when Rplot.cj is initiated by the "cron" facility, the program first checks a lock file to see whether the plot server's plotter is already running. If so, it simply exits.

If the plotter is available, then Rplot.cj verifies that there is at least a minimum amount of disk space to hold the resulting raster file that will be created from the raster template instructions. In the preferred embodiment, the minimum disk space requirement is set to at least 250 megabytes. If there is insufficient disk space, then Rplot.cj sends a message to the plot server console display stating that it is waiting for available disk space to process the template.

Once disk space is available on the plot server, Rplot.cj removes the raster template from the raster queue on the file server and places it into a temporary storage area on the plot server. The RFS facilities enable this procedure through remotely mounted disk space (see Glossary, Mounting File Systems). In other words, according to standard remote file access system functionality, the plot server has direct access to the raster queue on the file server, thereby enabling a direct transfer of the template file without the need to copy it across the network. (This is accomplished using the remote procedure calling mechanisms described, supra. See also, Glossary, Remote Procedure Calling).

With the design file plot template now physically on the plot server, the rasterization process is started by Rplot.cj. This involves a number of steps. The rasterization process, which Rplot.cj invokes, is actually a subprocess of the client workstation's ECAD system. The plot server, like a typical client workstation, starts the ECAD system, but only to run the rasterization process in a batch mode. Typically, when a ECAD system is started, the system searches for start-up or initialization files used to initialize a user's environment. Here, where the system is started only to process a batch job (e.g., rasterizing the design data specified by the plot template), if the system is initialized using environment settings found in a typical start-up or initialization file, uncontrollable and/or undesirable events can occur in the start-up, resulting in an error condition or an inability to complete the rasterization. To prevent this, the UNIX home-environment variable ($HOME) is reset to a location where there is little likelihood of the ECAD system encountering an initialization file when started by the plot server to rasterize a design file plot template.

Having reset the processing environment, Rplot.cj invokes the ECAD system with the template file as input. The template file, created earlier by Rplot, contains all the instructions necessary to direct the rasterization process. Rplot.cj now waits until the rasterization process is complete. During this period Rplot.cj occasionally checks the status of the raster process, echoing status messages to a log file. If in monitoring the rasterization Rplot.cj detects a problem (because the rasterization process is hung in an unknown or wait state; see Glossary, Process States and Transitions), then a run-log (/usr/tmp/rplot.runlog) is checked for the reason. If no reason can be found, Rplot.cj waits for a specified period of time before killing the process. This is to account for the possibility of heavy cpu processing of other tasks, which is typically a momentary problem.

If the rasterization process completes successfully, Rplot determines the number of copies of the plot (according to the template file), whether this is to be a monochrome or full color plot (in order to determine which plotter to use), and how much paper will be required and whether enough exists in the plotter.

The raster file is now queued to the plotting device using the standard UNIX "lpr" facility which, in turn, relies on the standard UNIX "lpd" or line printer daemon (see Glossary, Daemon Processes) to actually spool the file to the plotter.

Monitoring Plotting Status

The user can now employ a utility to view information about remote plotting jobs. The Plots utility (not shown, refer to Appendix C and D) displays the status of plotters and of all plots in the system. Plots displays jobs in the raster queue and the status of each plot server, including the time the status was last updated, available disk space, number of inches of paper remaining on the plotter, and the status of the plot server. If there are plot jobs queued for a plotter, the job status is displayed.

By default, Plots starts in an update mode. The status display is updated every minute. The user may exit the update mode at any time. Command line switches available at command invocation further allow the user to obtain a one time status report ("-o" switch), or to enter a menu mode ("-m" switch).

In the menu mode, there are several options available. These options are described below.

DE-QUEUE

The DE-QUEUE command prompts the user to select the raster queue or the plotter queue. Each queue maintains a list of jobs according to unique identifiers. For the raster queue, jobs may be de-queued by providing the job name which is the name of the design file plot template. For the plotter queue, which contains the rasterized plots waiting to be actually plotted, jobs may be de-queued by providing plot server name, the queue name and the job number.

KILL

The KILL command is used to kill plots that are in the process of being read or rasterized. This command prompts the user enter the name of the plot server on which to kill the job. Next the user must supply the desired processes identification number. The process ID is available from the status display and is reported in parenthesis after the plot name. For example, suppose the following status display entry:

"Reading a40's A40SLP60B.a07044 D(14049) for 1:55 CPU minutes"

The process ID is !4049. Plots allows only the owner to kill a particular plot job. Plots ensures this by comparing the user ID of the user attempting the kill command with the owner ID of the particular plot job in question.

PRIORITY

The priority command is used to change the priority of a plot job. Valid priorities are 1, 2, 3, and NONE. Jobs with priority of 1 have the highest priority and are repositioned in the plot queue as the next job to be plotted. Accordingly, those jobs with priority of NONE are the lowest and may be postponed from plotting, at least until the plotter queue is clear of any plot job with a priority of 3 or greater.

Other commands in the menu mode include a PAPER system to maintain the inches of paper used for plotting, which is important for the system in calculating the amount of paper required versus the amount of paper remaining). A STOP and a RE-START command are provided to allow stopping and re-starting of the plot queue. An UPDATE command allows the user to enter the update mode described previously, and a QUIT command allows the user to exit the Plots program altogether.

If plotting has stopped, the date and time it was stopped and the reason is displayed on the user's client workstation display.

GLOSSARY OF TERMS

Daemon Processes

Processes in the UNIX operating system are either user processes, daemon processes, or kernel processes. Most processes on a typical system are user processes, associated with users at a terminal. Daemon processes are not associated with any users but do system-wide functions, such as administration and control of networks, execution of time-dependent activities (e.g., cron), and line printer spooling (i.e., lpd). The init process (a process dispatcher usually run at boot time) may spawn daemon processes that exist throughout the lifetime of the system (the time between re-boot of the operating system). On occasion, users may spawn daemon processes.

Mounting File Systems

The UNIX system maintains regular files and directories on block devices such as tape or disks. A workstation or file server may have several physical disk drives each containing one or more file systems. Partitioning a disk into several file systems makes it easier to manage stored data. The operating system kernel addresses file systems on a logical level rather than the disks themselves, treating each disk as a logical device identified by a logical device number. The conversion between logical device (file system) addresses and physical device (disk) addresses is done by a disk driver.

Figure 9:
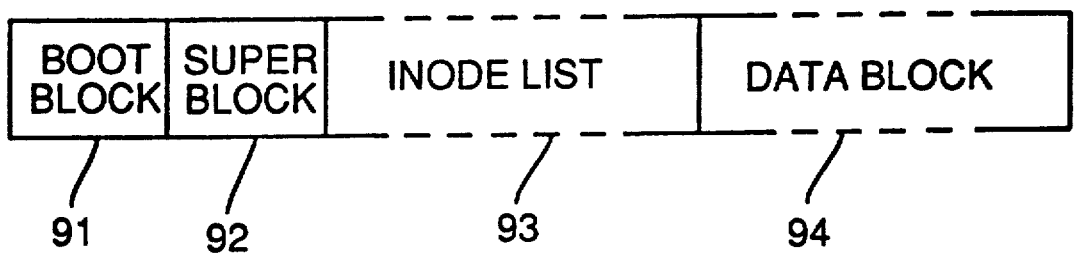
FIG. 9 Glossary of Terminology appearing at the end of the Detailed Description illustrates the block structure of a typical UNIX ® file system.

A file system consists of a sequence of logical blocks, each containing 512, 1024, 2048, or any convenient multiple of 512 bytes, depending on the system implementation. Referring to FIG. 9, a file system has the following structure:

The boot block 91 occupies the beginning of a file system, typically the first sector, and may contain bootstrap code that is read into the machine to boot, or initialize the operating system. Although only one boot block is required to boot the system, every file system has a (potentially empty) boot block.

The super block 92 describes the state of the file system (e.g., how large it is, how many files it can store, where to find free space on the file system, etc.).

The inode list 93 is a list of inodes that follows the super block in the file system. The operating system kernel references inodes by index into the inode list. One inode is the root inode of the file system: it is the inode by which the directory structure of the file system is accessible after execution of the mount system called (explained infra).

The data blocks 94 start at the end of the inode list and contain file data and administrative data. An allocated data block can belong to one and only one file in the file system.

A physical disk unit consists of several logical sections, partitioned by the disk driver, and each section has a device file name. Processes can access data in a section by opening the appropriate device file name and then reading and writing the "file," treating it as a sequence of disk blocks.

A section of a disk may contain a logical file system, consisting of a boot block, super block, inode list, and data blocks (as discussed earlier). The mount system call connects the file system in a specified section of a disk to the existing file system hierarchy, and a "umount"system calls disconnects the file system from the hierarchy. The mount system call allows users to access data in a disk section as a file system rather than a sequence of disk blocks. Processes can then access files on the mounted file systems and ignore the fact that they are detachable.

The operating system kernel has a mount table with entries for every mounted file system. Association of the mount point inode and the root inode of the mounted file system, set up during the mount system call, allows the kernel to traverse the file system hierarchy without any user knowledge.

It should be readily apparent, that when taken together with remote procedure calling mechanisms (explained elsewhere in this Glossary, and discussed in the Detailed Description section of the disclosure), this model can be extended across a network of computer workstations to implement a remote file access system.

Process States and Transitions (Overview)

Figure 10:
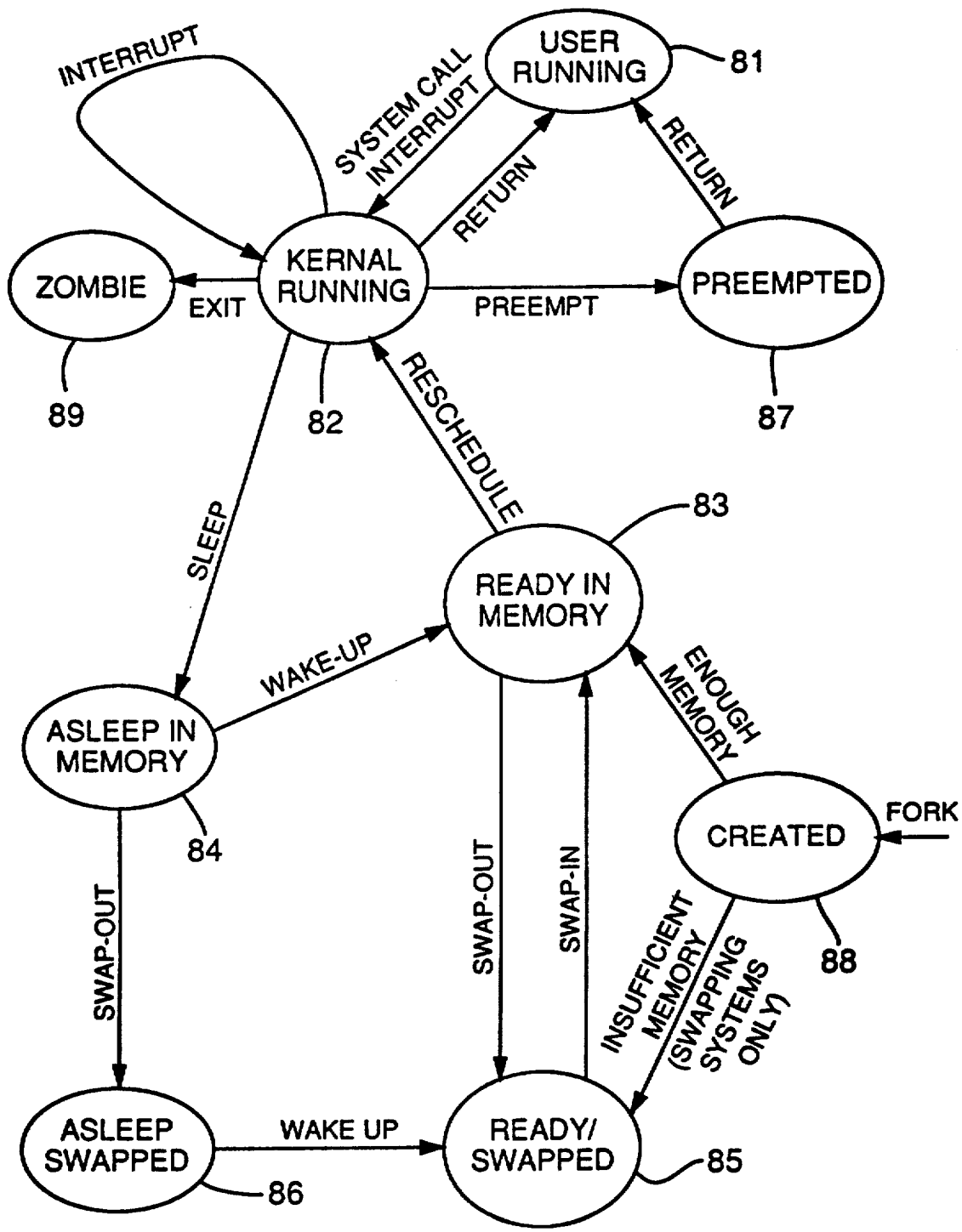
FIG. 10 the Glossary of Terminology appearing at the end of the Detailed Description illustrates the life of a typical UNIX ® process.

The lifetime of a UNIX process can be conceptually divided into a set of states that describe the process. Referring now to FIG. 10, the life of a process can be described as follows.

Process 81 is executing in user mode. Process 82 is executing in kernel mode. Process 83 is not executing but is ready to run as soon as the kernel schedules it. Process 84 is sleeping and resides in main memory (RAM). Process 85 is ready to run, but the swapper must swap the process (or the page daemon must page)

into main memory before the kernel can schedule the process to execute. Process 86 is sleeping, and the swapper has swapped the process out to disk memory (or the page daemon has paged out that portion of memory) to make room for other processes in main memory (RAM). Process 87 is returning from kernel mode to user mode, but the kernel preempts it and does a context switch to schedule another process. Process 88 is newly created and is in transition; the process exists, but is not ready to run, nor is it sleeping. This is the start state for all processes. Process 89 executed an exit system call and is in a zombie state. The process no longer exists, but leaves a record containing an exit code and timing statistics for its parent process to collect. This is the final state of a process.

The process states described above give a static view of a process, but processes move continuously between the states according to well-defined rules. See generally, The Design of the UNIX ® Operating System, Bach, Maurice J., Prentice Hall, Inc., Englewood Cliffs, New Jersey 1986.

Remote Procedure Call

The procedure call (sometimes referred to in the art as a function call or subroutine call) is a well-known method for transferring control from one part of a process to another, with a return of control to the caller. Many computer architectures implement this with an instruction of the form "jump-to-subroutine." Associated with the procedure call is the passing of arguments from the caller (hereinafter client) to the callee (hereinafter server). Similarly, there are often one or more return values from the called procedure. In most cases, a client and server are within a single process on a given computer system. They are linked together when the program file is generated. These are called local procedure calls.

In a remote procedure call (hereinafter RPC) a process on the local system launches a procedure on a remote system. The reason this is referred to as a procedure call is because the intent is to make the step transparent to the program relying on it. Nevertheless, remote procedure calls are very different from local procedure calls. Referring to FIG. 11, the following steps describe the process of a remote procedure call.

The client calls a local procedure (a client stub) at 101. It appears to the client that the client stub is the actual server procedure that it wants to call. The purpose of the stub is to package up the arguments to the remote procedure, possibly put them into some standard format, and then build one or more network messages.

Next, these network messages are sent to the remote system by the client stub at 102. This requires a system call into the local kernel.

Next, the network messages are transferred to the remote system at 103.

A server stub procedure is waiting on the remote system for the client's request. It unpacks the arguments from the network messages and converts them for local usage at 104.

The server stub then launches a local procedure call to carry out the actual file server function, passing it arguments that it received in the network messages from the client stub at 105.

When the server procedure is finished, it returns to the server stub with whatever return values that exist at 106.

The server stub, in turn, converts the return values and packages them into one or more network messages to send back to the client stub at 107.

The messages are then transferred back across the network to the client stub at 108.

Next, the client stub reads the network messages from the local kernel at 109.

After converting the return values, the client stub returns to the client function that originally invoked this process at 110. This appears to be a normal procedure return to the client who has no idea what has actually transpired.

See generally UNIX ® Network Programming, Stevens, Richard, Prentice Hall, Inc., Englewood Cliffs, New Jersey 1990.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

Appendix A

```
/*
remoteplot()
This program is used to plot remotely on a fileserver.

Written by Clif Schieck August 16, 1988
Rewritten and added to by Steve Reinschmidt August 23, 1988 modified 10/25/88 by Steve Reinschmidt to allow seperate
    options for run and save. Allow current to be specified
    for block path which will take the current block path.
    this is for rtplot an to make it easy to use current
    block path on an exsisting template.

11/03/88/BJGore
    Modified for remote plot spooling through rplotd.
12/28/88/BJGore
    Added support for multiple copies.
02/28/89/BJGore/SReinschmidt
    Fixed bug with block path conversion (clipped last char)
02/21/90/JCornwel
    Added ability to plot user specified layers, in groups or singuarly.
    For each group of layers a new desk is created.
*/
```

```
processInfo = nil
initLP   nil
savePlot = t

/*
 * MAIN_DESCRIPTION
 * NAME rplot  plot Cadence revisions on remote server
 *
 * DESCRIPTION
 *   Rplot plots a Cadence revision on a remote plot server, prompting
 *   for all necessary inputs and options, described below in FORM ENTRIES.
 *   All the inputs and plot options the user specifies can be saved for
 *   future use as a 'plot options template' or discarded.
 *   rplot allows the user to define which layers are to be plotted by
 *   1) no input will plot all the layers defined in the layer file.
 *   2) plot single or groups of layers.
 *   For each group of layers a separate desk is created a sent to
 *   /usr/common/spool/v42 to be plotted.
 *
 * ARGUMENTS
 *   None
 *
 * ENVIRONMENT
 *   plotTemplateDirectory
 *     directory where user's plot options templates are stored
 *     and read from, defaults to 'plotTemplate' in user's home
 *     directory.
 *   plotMagnification
 *     default plot magnification used when a new options template
 *     is created. Initialized to 100.
 *   plotLayersRevision
 *     default layers revision used when a new options template
 *     is created. Initialized to 'layers/plotter/current' in
 *     user's home directory.
 *
 * FORM ENTRIES
 *   ABORT?
 *     abort command, if 'yes', exists immediately.
 *   plotTemplate
 *     name of plot template from which options are in the
 *     form are read.
 *   blockName
 *     name of block to plot, defaults to block in window
 *     from which rplot is invoked, or 'myBlock' if none.
 *   representationName
 *     name of representation, defaults to 'layout'.
 *   askForPoints?
 *     if 'yes', user is prompted for the lower left and
 *     upper right coordinates of the area to be plotted in
 *     the current edit/view window, if there is one.
 *   lowerLeftWindowCoordinate
 *     current value of the lower left coordinate of the
 *     area to be plotted.
 *   upperRightWindowCoordinate
 *     current value of the upper right coordinate of the
 *     area to be plotted.
 *   magnification
 *     magnification value to use for the plot, defaults to 100.
 *   plotMosaicBordersOnly?
 *     if 'yes', array instances (mosaics) will be plotted in
 *     detail only on their borders. If 'no', the entire contents
 *     of mosaics are plotted.
 *   layersRevision
 *     plot layers revision which will be used to plot the block,
 *     defaults to 'layers/plotter/current'.
 *   blockPath
 *     library search list for blocks used in the block to be plotted.
 *   plotter
 *     plotter to use: one of: v42c -- versatec 42 inch color, v42bw -- versatec
 *     42 inch black and white.
 *   numberOfCopies
 *     number of copies to plot, defaults to 1.
 *   userUnitsPerMicron
 *     default number of user units per micron from layers revision.
 *   dbUnitsPerUserUnit
 *     default number of database units per user unit from layers revision.
 *   l1, l2, l3, l4, l5, etc.
 *     groups of validLayers to plot.
 *
```

```
*   SEE ALSO
*      Rtplot
* MAN1_DESCRIPTION
*/ procedure(rplot()
    prog( (version)
    version = msVersionDate("rplot")
    if(StrNull(version) then printMessage("rplot: Please wait...")
    else
        printMessage("rplot %s: Please wait..." version)
    )
    ccopies=1 l1 = l2 = l3 = l4 = l5 = ""
    LyrEntList = '((l1 "l1" "string" "") (l2 "l2" "string" "")
    (l3 "l3" "string" "") (l4 "l4" "string" "") (l5 "l5" "string" ""))

if(! InitP then
        getMyData()
    )
    getPlotValues()
    editPlotValues()
    rplotWorkhorse()
    )
)

/*
* MAN1_DESCRIPTION
* NAME rtplot  plot Cadence revisions on remote server from named template
*
* DESCRIPTION
*    Rtplot plots a Cadence revision on a remote plot server
*.   using an existing plot options template specified by the user.
*    After prompting the user for the name of a plot template which
*    was previously created (see rplot), rtplot displays the options
*    stored in the template in an input form, then submits the plot
*    to the server. The user may modify any of the entries in the template,
*    then save or discard the changes.
*
* ARGUMENTS
*    None
*
* ENVIRONMENT
*    plotTemplateDirectory
*       directory where user's plot options templates are stored
*       and read from, defaults to `plotTemplate' in user's home
*       directory.
*    plotMagnification
*       default plot magnification used when a new options template
*       is created. Initialized to 100.
*    plotLayersRevision
*       default layers revision used when a new options template
*       is created. Initialized to `layers/plotter/current' in
*       user's home directory.
*
* FORM ENTRIES
*    see rplot.
*
* SEE ALSO
*    Rplot
*
* MAN1_DESCRIPTION
*/
procedure(rtplot()
   prog( (prompt version)
     version = msVersionDate("rplot")
     if(StrNull(version) then
        prompt = "rtplot: Enter template name:"
     else
        sprintf(prompt "rtplot %s: Enter template name:" version)
     )
     ctempname=textEntry(prompt)
     if(StrNull(ctempname) then
        return(nil)
     else printMessage("Please wait...")
        if(readValues() then
```

```
            if(! initP then
               getMyData()
            )
            editPlotValues()
            rplotWorkhorse()
         )
      )
   )
)

procedure(rplotWorkhorse()
   if(createPlotTemplate() then
      if(savePlot == nil then
         fsDeleteFileP(fulltempname)
      )
   )
)

procedure(spoolPlot(fullTemplateName)
   prog( (status tempFile templateName template tmp spoolDir)
      spoolDir = msGetDefault("RemotePlotSpoolDirectory")
      templateName = pathTail(fullTemplateName)
      /*
       * make a unique filename in spool directory
       */
      sprintf(tempFile "%s/%s.XXXXXX" spoolDir prefix(templateName))
      template = mkTemp(tempFile)
      /*
       * copy to spool directory with resulting file mode 666
       */ if(msDebuggingP then
         printf("template: %s to %s\n" fulltempname template)
      )

status = system("cp %s %s ; chmod 666 %s"
         fulltempname template template)

if(msDebuggingP then
         printf("status from system: %d\n" status)
      ;

if(status != 0 then
         printf("spoolPlot: can't copy %s to spool file: %s\n"
            fulltempname template)
         return(nil)
      )
      return(t)
   )
)

procedure(getTemplatePath(name)
   prog( (templateDir)
      if(StrNull(name) return(nil))
      if(! savePlot then
         sprintf(fullname "%s/%s" msGetDefault("HomeDirectory") name)
         return(fullname)
      )
      if(isFullPath(name) then
         fullname = name
      else
         templateDir = msGetEnvVar("plotTemplateDirectory")
         if(StrNull(templateDir) then
         /*COMPATIBILITY*/
            if(boundp('defaultTemplateDir) &&
               ! StrNull(defaultTemplateDir) then
               sprintf(fullname "%s/%s"
                  defaultTemplateDir name)
            else
               sprintf(fullname "%s/%s"
                  msGetDefault("CurrentDirectory") name)
            )
         /*COMPATIBILITY*/
         else
            sprintf(fullname "%s/%s" expandTilde(templateDir) name)
         )
      )
      return(fullname)
   )
)
```

```
procedure(createPlotTemplate()
  prog((templateDir)
    if(abortPlot then
       return(nil)
    )
    winU1=linereadstring(win1)
    winU2=linereadstring(win2)
    dx=float(abs(xCoord(winU2) - xCoord(winU1)))
    dy=float(abs(yCoord(winU2) - yCoord(winU1)))
    scMax=getMaxScreenCoords()
    xnorm=16600/xCoord(scMax)
    ynorm=15600/yCoord(scMax)
    if(dx>dy then
       winC1=round(xCoord(scMax)*xnorm)
       winC2=round((yCoord(scMax)*(dy/dx))*ynorm)
else
  winC1=round((xCoord(scMax)*(dx/dy))*xnorm)
  winC2=round(yCoord(scMax)*ynorm)
)

if(LyrSymList = nil then fulltempname = getTemplatePath(ctempname)
  if((PTF=outfile(fulltempname)) == nil then
     printf("createPlotTemplate: can't open %s for writing\n"
        fulltempname)
     return(nil)
  )
  fprintf(PTF "\n|normalize coordinates|\n\n")
  fprintf(PTF "(0,0,0, \"set infix\");\n")
  fprintf(PTF "(0,0,0, \"setplotter %s\");\n" plotDev)
  fprintf(PTF "(0,0,0, \"DisplayControl plotter\");\n")
  fprintf(PTF "(0,0,0, \"DisplayControl read %s\");\n" players)
  fprintf(PTF "(0,0,0, \"setenv nofork\");\n")
  fprintf(PTF "(0,0,0, \"GraphicsEditor setpath %s\");\n" blkpth)
  fprintf(PTF "(0,0,0, \"open\");\n")
  fprintf(PTF "(%d,%d,2, \"\");\n" winC1 winC2)
  fprintf(PTF "(%d,%d,2, \"GraphicsEditor browse %s %s\");\n"
    winC1 - 1 winC2 - 1 blk rep)
  sprintf(zoomwin "skill zoomIn(list(list(%s) list(%s)))"
    win1 win2)
  fprintf(PTF "(%d,%d,0, \"GraphicsEditor %s\");\n"
    winC1 - 1 winC2 - 1 zoomwin)
  /*
   * set array border only variable
   */
  if(borderonly then
    arg="yes"
  else
    arg="no"
  )
  fprintf(PTF
    "(%d,%d,0, \"GraphicsEditor setwenv plotMosaicBordersOnly?=%s\");\n"
    winC1-1 winC2-1 arg)

fprintf(PTF "(%d,%d,0, \"plot X\");\n"
  winC1 - 1 winC2 - 1)
  fprintf(PTF "(%d,%d,2, \"\");\n"
  winC1 - 1 winC2 - 1)
  /*
   * set the magnification factor here
   */
  rmag=(mag/(cuupmic/cluupmic))*(float(cldupuu)/float(cdupuu))
  fprintf(PTF "(%d,%d,0, \"%f\");\n"
  winC1 - 1 winC2 - 1 rmag)
  fprintf(PTF "(%d,%d, 2, \"\");\n"
  winC1 - 1 winC2 - 1)
  fprintf(PTF "(%d,%d, 2, \"\");\n"
  winC1 - 1 winC2 - 1)
  /*
   * answer yes to the plot finished. continue?
   */
  fprintf(PTF "(%d,%d, 2, \"\");\n"
  winC1 - 1 winC2 - 1)

fprintf(PTF "(%d,%d,2, \"quit!\");\n"
  winC1 - 1 winC2 - 1)

/*
   * Add comments for reading template
   */
```

```
       fprintf(PTF "ttemplate info\n")
       fprintf(PTF "cplotDev=\"%s\"\n" plotDev)
       fprintf(PTF "cblkpth=\"%s\"\n" blkpth)
       fprintf(PTF "cblk=\"%s\"\n" blk)
       fprintf(PTF "crep=\"%s\"\n" rep)
       fprintf(PTF "cwin1=\"%s\"\n" win1)
       fprintf(PTF "cwin2=\"%s\"\n" win2)
       fprintf(PTF "cmag=%f\n" mag)
       if(borderonly then
          arg="t"
       else
          arg="nil"
       )
       fprintf(PTF "cborderonly=%s\n" arg)
       fprintf(PTF "clayers=\"%s\"\n" players)
       fprintf(PTF "cluupmic=%f\n" luupmic)
       fprintf(PTF "cldupuu=%d\n" ldupuu)
       fprintf(PTF "ccopies=%d\n" copies)
       if(LyrSymList != nil then
          fprintf(PTF "tLyrSymList=\"%s\"\n" msStringifyList(LyrSymList))
          foreach(symbol LyrSymList
             if(eval(symbol) != "" then ; skip symbols equal to nil
                strlyrs = eval(symbol)
                fprintf(PTF "t%s=\"%s\"\n" symbol strlyrs)
             )
          )
       else
          fprintf(PTF "tLyrSymList=nil\n")
       )
       close(PTF)
       if(spoolPlot(fulltempname) then
          announce("%s queued for plotting." tempname)
       else
          announce("%s couldn't be queued to plotter." tempname)
       )

else foreach(symbol LyrSymList
          if(eval(symbol) != "" then ; skip symbols equal to nil
             strlyrs = eval(symbol)
             fulltempname = getTemplatePath(ctempname)
             if((PTF=outfile(fulltempname)) == nil then
                printf("createPlotTemplate: can't open %s for writing\n"
                fulltempname)
                return(nil)
    )
    fprintf(PTF "\n[normalize coordinates]\n\n")
    fprintf(PTF "(0,0,0, \"set infix\");\n")
    fprintf(PTF "(0,0,0, \"setplotter %s\");\n" plotDev)
    fprintf(PTF "(0,0,0, \"DisplayControl plotter\");\n")
    fprintf(PTF "(0,0,0, \"DisplayControl read %s\");\n" players)
    fprintf(PTF "(0,0,0, \"setenv nofork\");\n")
    fprintf(PTF "(0,0,0, \"GraphicsEditor setpath %s\");\n" blkpth)
    fprintf(PTF "(0,0,0, \"open\");\n")
    fprintf(PTF "(%d,%d,2, \"\");\n" winC1 winC2)
    fprintf(PTF "(%d,%d,2, \"GraphicsEditor browse %s %s\");\n"
       winC1 - 1 winC2 - 1 blk rep)
    sprintf(zoomwin "skill zoomIn(list(list(%s) list(%s)))"
       win1 win2)
    fprintf(PTF "(%d,%d,0, \"GraphicsEditor %s\");\n"
       winC1 - 1 winC2 - 1 zoomwin)
    /*
    * set array border only variable
    */
    if(borderonly then
       arg="yes"
    else
       arg="no"
    )
    fprintf(PTF
    "(%d,%d,0, \"GraphicsEditor setwenv plotMosaicBordersOnly?=%s\");\n"
    winC1 1 winC2 1 arg)

fprintf(PTF "(%d,%d,0, \"GraphicsEditor skill vlayeroff()\");\n"
    winC1  1 winC2  1)
    sprintf(xlyrs "skill vlayer(\\\"%s\\\")" strlyrs)
    fprintf(PTF "(%d,%d,0, \"GraphicsEditor %s\");\n"
    winC1  1 winC2  1 xlyrs)
```

```
fprintf(PTF "(%d,%d,0, \"plot X\");\n"
winC1 - 1 winC2 - 1)
fprintf(PTF "(%d,%d,2, \"\");\n"
winC1 - 1 winC2 - 1)
/*
 * set the magnification factor here
 */
rmag=(mag/(cuupmic/cluupmic))*(float(cldupuu)/float(cdupuu))
fprintf(PTF "(%d,%d,0, \"%f\");\n"
winC1 - 1 winC2 - 1 rmag)
fprintf(PTF "(%d,%d, 2, \"\");\n"
winC1 - 1 winC2 - 1)
fprintf(PTF "(%d,%d, 2, \"\");\n"
winC1 - 1 winC2 - 1)
/*
 * answer yes to the plot finished. continue?
 */
fprintf(PTF "(%d,%d, 2, \"\");\n"
winC1 - 1 winC2 - 1)

fprintf(PTF "(%d,%d,2, \"quit!\");\n"
winC1 - 1 winC2 - 1)
            /*
             * Add comments for reading template
             */
            fprintf(PTF ";template info\n")
            fprintf(PTF ";cplotDev=\"%s\"\n" plotDev)
            fprintf(PTF ";cblkpth=\"%s\"\n" blkpth)
            fprintf(PTF ";cblk=\"%s\"\n" blk)
            fprintf(PTF ";crep=\"%s\"\n" rep)
            fprintf(PTF ";cwin1=\"%s\"\n" win1)
            fprintf(PTF ";cwin2=\"%s\"\n" win2)
            fprintf(PTF ";cmag=%f\n" mag)
            if(borderonly then
                arg="t"
            else
                arg="nil"
            )
            fprintf(PTF ";cborderonly=%s\n" arg)
            fprintf(PTF ";clayers=\"%s\"\n" players)
            fprintf(PTF ";cluupmic=%f\n" luupmic)
            fprintf(PTF ";cldupuu=%d\n" ldupuu)
            fprintf(PTF ";ccopies=%d\n" copies)
            if(LyrSymList != nil then
                fprintf(PTF ";LyrSymList=\"%s\"\n" msStringifyList(LyrSymList))
                foreach(symbol LyrSymList
                    if(eval(symbol) != "" then ; skip symbols equal to nil
                        strlyrs = eval(symbol)
                        fprintf(PTF ";%s=\"%s\"\n" symbol strlyrs)
                    )
                )
            else
                fprintf(PTF ";LyrSymList=nil\n")
            )
            close(PTF)
            if(spoolPlot(fulltempname) then
                announce("%s queued for plotting." tempname)
            else
                announce("%s couldn't be queued to plotter." tempname)
            )
        )
    )
    ;
    printMessage("Plot Template Saved")
    if(doit then
        return(t)
    else
        return(nil)
    )
  )
)

procedure(getPlotValues()
  prog((rx_val userMag)
    plotlist=list("v42c" "v42bw")
    cplotDev="v42c"
    cblk=getWindowRep()->blockName
    if(! cblk then
       cblk = ""
    )
    rx_val=rindex( cblk "/" )
```

```
if( rx_val then
   sprintf(ctempname "%s.plt" substring( rx_val 2 ) )
else
   sprintf(ctempname "%s.plt" cblk )
)
crep=getWindowRep()->repName
if(crep==nil then crep="layout")
cwin=getWindowUserCoords()
if(cwin!=nil then
   sprintf(cwin1 "%f %f",xCoord(car(cwin)),yCoord(car(cwin)))
   sprintf(cwin2 "%f %f",xCoord(cadr(cwin)),yCoord(cadr(cwin)))
else
   cwin1=nil
   cwin2=nil
)
cmag = msGetEnvVar("plotMagnification")
if(! cmag then
   /*COMPATIBILITY*/
   if(boundp('defaultPlotMag) then
      cmag=float(defaultPlotMag)
   else
      cmag=100.0
   )
   /*COMPATIBILITY*/
)
if(! floatp(cmag) then
   cmag = float(cmag)
)

case(crep
   /*
    * plot schematics specially
    */
   ("schematic"
      cuupmic=0.00003937
      cdupuu=160
   )
   /*
    * plot everything else as if it were a layout
    */
   (t
      cuupmic=1.0
      cdupuu=1000
   )
)

if(! (cuupmic = msGetEnvVar("plotUserUnitsPerMicron")) then
   /*COMPATIBILITY*/
   if(boundp('defaultUUsrUnit) then
      cuupmic=float(defaultUUsrUnit)
   else
      cuupmic=1.0
   )
      /*COMPATIBILITY*/
   )
   if(! (cldupuu = msGetEnvVar("plotDBUnitsPerUserUnit")) then
      /*COMPATIBILITY*/
      if(boundp('defaultDbUnit) then
         cldupuu=defaultDbUnit
      else
         cldupuu=1000
      )
      /*COMPATIBILITY*/
   )
   cborderonly=t
   if(! (clayers = msGetEnvVar("plotLayersRevision")) then
      /*COMPATIBILITY*/
      if(boundp('defaultPlotterLayers) then
         clayers=defaultPlotterLayers
      else
         sprintf(clayers "%s/layers/plotter/current" homedir)
      )
      /*COMPATIBILITY*/
   )
   getBlockPath()
)
)

procedure(getBlockPath()
   prog( (Lmp)
```

```
    tmp = expandBlockPathToList()
    cblkpth = msStringifyList(tmp)
  )
)
procedure(editPlotValues()
  prog( (prompt)
    flag=t
    getPlotSize()
    sprintf(prompt
      "Plot size will be %fcm by %fcm (%fin by %fin)"
      xdim ydim xdim/2.54 ydim/2.54)

while(flag
      askForOptions(prompt)
      flag=nil
      if(abortPlot then
        return()
      )
      ctempname=tempname
      cplotDev=plotDev
      cblk=blk
      crep=rep
      cmag=mag
      cborderonly=borderonly
      clayers=players
      cwin1=win1
      cwin2=win2
      cluupmic=luupmic
      cldupuu=ldupuu
      ccopies=copies
      if(blkpth=="current" then
        getBlockPath()
        flag=t
      else
        cblkpth=blkpth
      )
      if(crdtype then
        crd1=getPoint("Input first coord of window")
        crd2=getPoint("Input second coord of window" "box")
        sprintf(cwin1 "%f %f",xCoord(crd1),yCoord(crd1))
        sprintf(cwin2 "%f %f",xCoord(crd2),yCoord(crd2))
        getPlotSize()
        sprintf(prompt
          "Plot size will be %fcm by %fcm (%fin by %fin)"
          xdim ydim xdim/2.54 ydim/2.54)
        flag=t
      else
        if(!flag then
          getPlotSize()
          if((xdim/ydim)>10 then
            sprintf(prompt
            "Aspect ratio too high for %fin by %fin plot. %s"
            xdim/2.54 ydim/2.54
            "(plot will be increased in Y direction)")
            ydimM=(xdim/ydim)/9.95
            xdimM=1
          else
            if((ydim/xdim)>10 then
              sprintf(prompt
              "Aspect ratio too high for %fin by %fin plot. $s"
              xdim/2.54 ydim/2.54
              "(plot will be increased in X direction)")
              xdimM=(ydim/xdim)/9.95
              ydimM=1
            else
              xdimM=1
              ydimM=1
              sprintf(prompt
              "Plot size will be %fcm by %fcm (%fin by %fin)"
              xdim ydim xdim/2.54 ydim/2.54)
            )
          )
        )

confirmPlotOptions(prompt)

if(abortPlot then return(nil))
      fixAspectRatio()
      if(!formagain then
        getPlotSize()
```

```
      if((xdim>101.6) && (ydim>101.6) then
        sprintf(prompt
          "*WARNING* Plot width will be greater then 40 inches (size %fin by %fin)"
          xdim/2.54 ydim/2.54)
        ringBell()
                confirmPlotOptions(prompt)

if(abortPlot then return(nil))
                 if(!formagain then
                   flag=nil
                 else
                   flag=t
                   sprintf(prompt
                     "Plot size will be %fcm by %fcm (%fin by %fin)"
                     xdim ydim xdim/2.54 ydim/2.54)
                 )
              else
                flag=nil
              )
           else
             flag=t
             getPlotSize()
             sprintf(prompt
               "Plot size will be %fcm by %fcm (%fin by %fin)"
               xdim ydim xdim/2.54 ydim/2.54)
           )
        )
      )
    )
  )
)

procedure(confirmPlotOptions(prompt)
  makeForm(prompt
    list('abortPlot "Abort?" "yesOrNo" "no")
    list('doit "Submit?" "yesOrNo" "yes")
    list('savePlot "Save template?" "yesOrNo" "yes")
    list('formagain "Display input form again?" "yesOrNo" "no")
  )
)

procedure(askForOptions(prompt)
  prog( (helpscript)
    if(msGetEnvVar("plotTemplateDirectory") || boundp('defaultTemplateDir) then
      sprintf(helpscript "default Dir used")
    else
      sprintf(helpscript "no def Directory")
    )
    mlpEntry = nil
    LyrSymList = nil
    symFlag = nil
TOP
    fixFormRespList = list(
      list('abortPlot "ABORT?" "yesOrNo" "no")
      list('tempname "plotTemplate" "string" ctempname nil helpscript)
      list('blk "blockName" "string" cblk)
      list('rep "representationName" "string" crep)
      list('crdtype "askForPoints?" "yesOrNo" "no")
      list('win1 "lowerLeftWindowCoordinate" "string" cwin1)
      list('win2 "upperRightWindowCoordinate" "string" cwin2)
      list('mag "magnification" "float" cmag)
      list('borderonly "plotMosaicBordersOnly?" "yesOrNo" cborderonly)
      list('players "layersRevision" "string" clayers)
      list('blkpth "blockPath" "string" cblkpth)
      list('plotDev "plotter" "string" cplotDev plotlist)
      list('copies "numberOfCopies" "integer" ccopies 1:9)
      list('luupmic "userUnitsPerMicron (layer file)" "float" cluupmic)
      list('ldupuu "dbUnitsPerUserUnit (layer file)" "integer" cldupuu)
    ;

fillFormRespList = append(fixFormRespList LyrEntList)

formRespList   makeEditForm(prompt fillFormRespList)

formRespList = remove('abortPlot formRespList)
    formRespList = remove('tempname formRespList)
    formRespList = remove('blk formRespList)
    formRespList = remove('rep formRespList)
    formRespList = remove('crdtype formRespList)
    formRespList = remove('win1 formRespList)
```

```
    formRespList = remove('win2 formRespList)
    formRespList = remove('mag formRespList)
    formRespList = remove('borderonly formRespList)
    formRespList = remove('players formRespList)
    formRespList = remove('blkpth formRespList)
    formRespList = remove('plotDev formRespList)
    formRespList = remove('copies formRespList)
    formRespList = remove('luupmic formRespList)
    formRespList = remove('ldupuu formRespList)

lyrEntList = makeFormList(formRespList)
    lyrSymList = formRespList validLayers = dbAllLayerNames(t)
    foreach(symbol formRespList
      if(eval(symbol) != "" then ; skip symbols equal to nil
        mlpEntry = string2list(eval(symbol))
        symFlag = t
      )
      foreach(lyr mlpEntry
        if(!member(lyr validLayers) then
          announce("layer \"%s\" - not specified in layers file" lyr)
          go(TOP)
        )
      )
    )
    if(symFlag == nil then
      lyrSymList = nil
    )
  )
)

/*
 * makeFormList - produces a form list from a list of symbols
 */
procedure(makeFormList(varList)
  prog( (element formEntry formList)
    foreach(element varList
      formEntry = list(element get_pname(element) "string" symeval(element))
      APPEND(formEntry formList)
    )
    return(formList)
  )
)

procedure(readValues()
  prog( nil
    cldupuu=0
    cluupmic=0
    copies=1
    lyrsymlist = nil
    lyrflag = nil fullTempname = getTemplatePath(ctempname)

if(! (template=infile(fullTempname)) then
      printf("readValues: can't open %s for reading\n"
        fullTempname)
      return(nil)
    )
    gets(inline template)
    while(inline!="!template info\n"
      if(! gets(inline template) then
        printf("rplot.readValues: no template info in file: %s"
          fullTempname)
        close(template)
        return(nil)
      )
    )
    while(gets(inline template)
      evalstring(substring(inline 2))
    )
    close(template)
    plotList list("v42c" "v42bw")
    cruType="useCurrentCoords"
    cruTypelist=list("useCurrentCoords" "askForPoints")
    if(cluupmic==0 then
      if(! (cluupmic = msGetEnvVar("plotUserUnitsPerMicron")) then
```

```
        /*COMPATIBILITY*/
        if(boundp('defaultUUsrUnit) then
          cuupmic=float(defaultUUsrUnit)
        else
          cuupmic=1.0
        )
        /*COMPATIBILITY*/
      )
    )
    if(cldupuu==0 then
      if(! (cldupuu = msGetEnvVar("plotDBUnitsPerUserUnit")) then
        /*COMPATIBILITY*/
        if(boundp('defaultLDbUnit) then
          cldupuu=defaultLDbUnit
        else
          cldupuu=1000
        )
        /*COMPATIBILITY*/
      )
    )
    case(crep
      (("layout" "autoLayout")
        cuupmic=1.0
        cdupuu=1000
      )
      ("schematic"
        cuupmic=0.00003937
        cdupuu=160
      )
      (t
        cuupmic=1.0
        cdupuu=1
      )
    )

lyrSymList = string2list(lyrSymList)
    xLyrEntList = "list("
    foreach(symbol lyrSymList
      sprintf(str "list('%s \"%s\" \"string\" %s) " symbol symbol symbol)
      xLyrEntList = strcat(xLyrEntList str)
    )
    xLyrEntList = strcat(xLyrEntList ")")
    lyrEntList = evalstring(xLyrEntList)

if(lyrEntList == nil then
      l1 = l2 = l3 = l4 = l5 = nil
      lyrEntList = list(list('l1 "l1" "string" l1) list('l2 "l2" "string" l2)
                       list('l3 "l3" "string" l3) list('l4 "l4" "string" l4)
                       list('l5 "l5" "string" l5))
    )

return(t)
  )
)

procedure(getMyData()
  workdir = getShellEnvVar("PWD")
  homedir = getShellEnvVar("HOME")
  myname = getShellEnvVar("USER")
  /*COMPATIBILITY*/
  if(! boundp('defaultTemplateDir) then
    defaultTemplateDir = msGetEnvVar("plotTemplateDirectory")
  )
  /*COMPATIBILITY*/
  initP = t
)

procedure(getPlotSize()
  prog(nil
    if(boundp('cwin1) && cwin1!=nil then
      incrd=instring(cwin1)
      fscanf(incrd "%f %f" x1 y1)
      close(incrd)
      incrd=instring(cwin2)
      fscanf(incrd "%f %f" x2 y2)
      close(incrd)
      dx=abs(x2 - x1)
      dy=abs(y2 - y1)
      xdim=(dx*cmag)/(10000*cuupmic)
```

```
        ydim=(dy*cmag)/(10000*cuupmic)
      else
        xdim=0.0
        ydim=0.0
      )
    )
)

procedure(fixAspectRatio()
  prog( nil
    if(cwin1!=nil then
      incrd=instring(cwin1)
      fscanf(incrd "%f %f" x1 y1)
      close(incrd)
      incrd=instring(cwin2)
      fscanf(incrd "%f %f" x2 y2)
      close(incrd)
      dx=abs(x2 - x1)*(xdimM - 1)
      dy=abs(y2 - y1)*(ydimM - 1)
      if(x1>x2 then
        x1=x1+dx
      else
        x2=x2+dx
      )
      if(y1>y2 then
        y1=y1+dy
      else
        y2=y2+dy
      )
      sprintf(cwin1 "%f %f" x1 y1)
      sprintf(cwin2 "%f %f" x2 y2)
    )
  )
)
```

Appendix B

```
#! /bin/csh  f

# rplot.cj    remote versatec plotting cron job
# 11/09/85/BJGore

# Copyright (C) 1990, Micron Technology, Inc. All Rights Reserved.

# This program is designed to be run from cron. It supports any number of
#       plot servers, however, no two rplot.cj's should be started simultaneously
#       because that could result in a race when removing jobs from the queue. So
#       if you have one server, rplot.cj can start every minute. If you have two
#       servers, rplot.cj on one starts on the even minutes and on the other starts
#       on the odd minutes. If you have three servers, the first rplot.cj would run
#       every 1, 4, 7, etc. minute, the second would run every 2, 5, 8, etc. minute
#       and the third would run every 3, 6, 9, etc. minute and so on. The crontab
#       entry should be as follows:

#            <minutes to run> * * * * /bin/rplot.cj >> /usr/tmp/rplot.runlog 2>&1

# This program requires the following entries in /usr/cds/etc/mfbcap:

#       v42c|versatec42c|Versatec 42 inch color plotter,
#               QUEUE=lpq -P v42c,
#               CACHE=300, MXC=8000, MCE=vgc,
#       v42bw|versatec42|Versatec 42 inch b/w plotter,
#               QUEUE=lpq -P v42,
#               CACHE=300, MXC=8192, MCE=vg,

# Define some constants:

# HST= hostname, DIR= spool directory, LKF= rplot lock file
# PSF= plotting stopped file

set HST = `hostname`
set DIR="/usr/common/spool/v42"
set LKF="/usr/common/status/rplot/.lock.$HST"
set PSF="/usr/common/status/rplot/.noplots.$HST"

# If already running or if plotting stopped, just exit

if ( -f $LKF || -f $PSF ) exit 1
```

```

# Define some more constants:
#       ST= start time, RRL= rplot run log,     RLF= local rplot log file

set ST=(`date '+%T'`)
set RRL="/usr/tmp/rplot.runlog"
set RLF="/usr/tmp/rplot.log"

# Make sure there is at least 250 Meg of free disk space, else wait for it

set KBFREE=`df | grep /usr\$ | awk '{print $4}'`
if ( $KBFREE <= 250000 ) then
        echo "`date` Waiting for disk space"
        echo "Waiting for disk space..." > $LKF
        while ( $KBFREE <= 250000 )
                sleep 60
                set KBFREE=`df | grep /usr\$ | awk '{print $4}'`
        end
        echo "`date` Got disk space"
        rm -f $LKF
        goto done
endif

# I guess we're going to need them, so define some more constants:
#       CRL= cds run log, RTF= rplot tmp file, PF= paper length file
#       SEQ= sequence letter for stripped plots, TCRL= temp cds run log
#       pwaste= plot waste, cwaste= copy waste, swaste= strip waste

set CRL "/usr/tmp/cds.runlog"
set TCRL "/usr/tmp/tmp.crl"
set RTF "/usr/tmp/rtf"
set PF "/usr/common/status/rplot/.paper.$HIST"
set SEQ ( a b c d e f g h i j k l m n o p q r s t u v w z y z )
@ pwaste = 18
@ cwaste = 12
@ swaste = 8

# Filter caeco files out of rndps2

if ( "$HIST" == "rndps2" ) then
        set BASEFN=(`ls -L -r $DIR | grep -v '^[.]' | grep -v 'PRlog' | grep -v 'caeco' | head -1`)
else
        set BASEFN=(`ls -L -r $DIR | grep -v '^[.]' | grep -v 'PRlog' | head -1`)
endif

# If there are no files in the queue to plot, just exit

if ( "$BASEFN" == "" ) exit 0

# Set up the variables for this plot

set FILE="/usr/tmp/${BASEFN}.$$"
set OWNER=`ls -l $DIR/$BASEFN | awk '{print $3}'`
set STATUS="RUNNING"
set TYPE "UNK"

# Determine if this is a Cadence(cds) or Caeco(scs) plot

set VAR=`echo $FILE | grep caeco`
if ( x$VAR == x ) then
        ###############################################################
        #                    CADENCE PLOTTING CODE                    #
        ###############################################################
        #
        # Get the plot out of the queue and set it up for rasterization
        #
        mv ${DIR}/$BASEFN $FILE
        /etc/chown $OWNER $FILE
        echo -n "Reading ${OWNER}'s $BASEFN" > $LKF
        chmod 644 $LKF
        #
        # Start rasterization as the owner of the job. This is tricky.
        # We change the HOME variable so that opencds doesn't read the
        # users .sdare file. We exec the opencds so the pid reported
        # in the log file is that of opencds, not of su.
        #
```

```
cd /usr/tmp
echo -n "`date` $(BASEFN): Reading "
setenv CDS_LICENSE_FILE /etc/license/license.`hostid`
su $OWNER -f -c "setenv HOME /usr/tmp; exec /cds/bin/opencds -nolog -display n0 -desk ${FILE} >& $CRL &"

# Get pid of the opencds process, pad it to five places with 0s
# and set up the name of the raster file.

set CDS_PID = `tail -1 $CRL | awk '{ print $NF }'`
if ( $CDS_PID < 100 ) then
        set CDS_PID_STR = "000$CDS_PID"
else if ( $CDS_PID < 1000 ) then
        set CDS_PID_STR = "00$CDS_PID"
else if ( $CDS_PID < 10000 ) then
        set CDS_PID_STR = "0$CDS_PID"
else
        set CDS_PID_STR = "$CDS_PID"
endif
set SQF = "/usr/tmp/sqmhca$CDS_PID_STR"

# Wait for the raster file to be created.

 cnt = 1
while ( ! -f $SQF && $cnt < 40 )
        sleep 15
        @ cnt = $cnt + 1
end
if ( $cnt < 40 ) then
        set STATUS = "RUNNING"
else
        set STATUS = "SETUP_ERROR"
        cp $CRL $TCRL
        echo "" >> $TCRL
        sed -e 's/---/\\
/g' -e 's/\.\.\./\\
/g' -e 's/\.\./\\
/g' $TCRL | tail -10
        rm -f $TCRL
endif

# Now wait for the job to finish or determine that we have a bad plot

@ cnt = 1
while ( $STATUS == RUNNING )
        sleep 15
        set SQF_SIZE = `ls -l $SQF | awk '{ print $4 }'`
        if ( $SQF_SIZE > 0 ) then
                #
                # Ok, looks like it will work, wait for opencds to finish
                #
                echo "`date` $(BASEFN): Rasterizing"
                echo -n "Rasterizing $(OWNER)'s $BASEFN" > $LKF
                while ( $STATUS == RUNNING )
                        if ( "`ps ax | grep -w $CDS_PID | grep -v grep`" == "" ) then
                                set STATUS="OK"
                        else
                                sleep 30
                        endif
                end
        else
                #
                # looks like there is a problem. If there's a bell in the
                # cds run log, then we know there was a problem and what it is
                #
                if ( "`od -a $CRL | grep bel`" != "" ) then
                        echo "`date` $(BASEFN): ERROR Reading"
                        kill -15 $CDS_PID
                        sleep 5
                        echo "`date` $(BASEFN): $(CRL) follows:"
                        cp $CRL $TCRL
                        echo "" >> $TCRL
                        sed -e 's/---/\\
/g' -e 's/\.\.\./\\
/g' -e 's/\.\./\\
/g' $TCRL | tail 10
                        kill -9 $CDS_PID
                        set STATUS="READ_ERROR"
                        rm -f $SQF $TCRL
                else
                        @ cnt = $cnt + 1
```

```
                        endif
                endif
                if ( $cnt > 479 ) then
                        #
                        # Couldn't figure out what the problem was, but lets nuke
                        # this mother after 120 minutes so we can get on with the program
                        #
                        echo "`date` ${BASEFN}: EXCESSIVE READ TIME"
                        kill -15 $CDS_PID
                        sleep 5
                        echo "`date` ${BASEFN}: ${CRL} follows:"
                        cp $CRL $TCRL
                        echo "" >> $TCRL
                        sed -e 's/---/\\
/g' -e 's/\.\.\./\\
/g' -e 's/\./\\
/g' $TCRL | tail -10
                        kill -9 $CDS_PID
                        set STATUS="LAYER_ERROR"
                        rm -f $SQF $TCRL
                endif
        end
        #
        # Rasterization is complete, now plot it
        #
        if ( $STATUS == OK ) then
                #
                # So far, so good. Get number of copies and mag.
                #
                set COPIES=`grep 'Iccopies=' $FILE | awk -F= '{print $2}'`
                set MAG=`grep 'Icmag=' $FILE | awk -F= '{print $2}'`
                if ( "$COPIES" == "" ) then
                        set COPIES="1"
                endif
                set PINFO="C${COPIES};M$MAG"
                #
                # Figure out whether we're plotting color or black & white
                #
                cp $CRL $TCRL
                echo "" >> $TCRL
                sed -e 's/ /\\
/g' $TCRL | grep -w v42bw | head -1 > $RTF
                if ( "`cat $RTF`" != "" ) then
                        #
                        # Black & White plot setup
                        #
                        set PRTR="v42bw"
                        set SPL="/usr/spool/v42d"
                        set TYPE="cds(B)"
                else
                        #
                        # Color plot setup
                        #
                        set PRTR="v42c"
                        set SPL="/usr/spool/v42cd"
                        set TYPE="cds(C)"
                endif
                rm -f $RTF
                #
                # Find out how many sections (individual plots) there will be
                #
                sed -e 's/(/\\
/g' -e 's/)/\\
/g' -e 's/\./\\
/g' $TCRL | grep 'will have' | head -1 > $RTF
                set num_sects = `awk '{print $4}' $RTF`
                rm -f $RTF
                #
                # Now determine how much paper this plot will take.
                #
                sed -e 's/(/\\
/g' -e 's/)/\\
/g' $TCRL | grep -w inches > $RTF
                set sz1 = ( `cat $RTF` )
                rm -f $RTF $TCRL
                @ x = `echo $sz1[1] | awk -F. '{print $1}'`
                @ y = `echo $sz1[3] | awk -F. '{print $1}'`
```

```
@ tw = $pwaste + ($num_sects - 1) * $COPIES * $swaste + ($COPIES - 1) * $cwaste
        if ( $x < 40 && $y < 40 ) then
                if ( $x < $y ) then
                        @ pl = $x * $COPIES + $tw
                else
                        @ pl = $y * $COPIES + $tw
                endif
        else
                if ( $x < $y ) then
                        @ pl = $y * $COPIES + $tw
                else
                        @ pl = $x * $COPIES + $tw
                endif
        endif
        #
        # Plot each section
        #
        @ cnt = 1
        while ( $cnt <= $num_sects )
                set PLOT="$(BASEFN}${SEQ[$cnt]}.$$"
                mv -f /usr/tmp/sqmhc${SEQ[$cnt]}$CDS_PID_STR /usr/tmp/$PLOT
                #
                # Make sure we have enough paper for this plot
                #
                set INCHES=`cat $PF`
                if ( $INCHES < $pl ) then
                        echo "Waiting for paper (have $(INCHES], need $pl inches)..." > $LKF
                        while ( $INCHES < $pl )
                                sleep 60
                                set INCHES=`cat $PF`
                        end
                endif
                #
                # Now we perform some fancy footwork to make the plot
                # job owner who it should really be, rather than root
                #
                /usr/etc/lpc stop $PRTR >& /dev/null
                lpr -\#$COPIES -s -r -v -P$PRTR -C$PINFO $PLOT
                set pcf=`grep -l $PLOT $(SPL}/c* | head -1`
                sed "s/Lroot/L$(OWNER]/" $pcf > $(pcf).tmp
                sed "s/Proot/P$(OWNER]/" $(pcf).tmp > $pcf
                /usr/etc/lpc start $PRTR >& /dev/null
                rm -f $pcf.tmp
                echo "`date` $(BASEFN]: Queued $PLOT"
                echo "Queued $PLOT" > $LKF
                @ cnt = $cnt + 1
        end
endif
else
#########################################################
#                    CAECO PLOTTING CODE                #
#########################################################

# Get the plot out of the queue and set it up for rasterization

mv ${DIR}/$BASEFN $FILE
echo -n "Rasterizing ${OWNER]'s $BASEFN" > $LKF
chmod 644 $LKF

# Make sure we have enough paper for this plot

@ pl = 88
@ num_sects = 1
set INCHES=`cat $PF`
if ( $INCHES < $pl ) then
        echo "Waiting for paper (have $(INCHES], need $pl inches)..." > $LKF
        while ( $INCHES < $pl )
                sleep 60
                set INCHES=`cat $PF`
        end
endif

# Start rasterization and plot spooling (the spooling is done
# automatically by vrplot which doesn't go through lpd)

set STATUS="OK"
set TYPE="scs(C)"
echo "`date` ${BASEFN]: Rasterizing"
/usr/bin/vrplot `cat $FILE` >& /usr/tmp/vrplot.runlog
echo "`date` ${BASEFN]: Plotted"
```

```
        rm -f /usr/tmp/vrplot.runlog
endif

# Ok, we're done. Now do some logging and quit

logger -t "$ST $OWNER" -p local5.info "$TYPE $BASEFN $STATUS"

if ( $STATUS == OK ) then
        echo "`date` $(BASEFN): $(TYPE), $num_sects sect., $pl in."
        #
        # Decrement paper length
        #
        set INCHES=`cat $PF`
        @ cnt = $INCHES - $pl
        echo "$cnt" > $PF
else
        echo "`date` $(BASEFN): $STATUS"
        /usr/ucb/mail -s "rplot job: $BASEFN" $OWNER < $RRL
        /usr/ucb/mail -s "rplot job: $BASEFN" root < $RRL
endif

# Clean up and quit

rm -f $FILE $LKF $CRL /usr/tmp/PANIC /usr/tmp/PRlog /usr/tmp/core

# Cat the rplot run log onto the permanent rplot log and make a new
#       rplot log when it gets bigger than 50K.

done:
if ( -f $RRL ) then
        echo "" >> $RLF
        cat $RRL >> $RLF
        rm -f $RRL
        set cnt = `ls -l $RLF | awk '{print $4}'`
        if ( $cnt > 50000 ) then
                rm -f $[RLF].*
                mv $RLF $[RLF].`date '+%m%d%y'`
        endif
endif
exit(0)
```

Appendix C

```

# plots.cj -- Micron versatec plot status cron job
# 08/23/89/BJGore

# Copyright (C) 1990, Micron Technology, Inc. All Rights Reserved.

SF="/usr/common/status/rplot/plots.`hostname`"
TF="/tmp/.lock.plots"
NPF="/usr/common/status/rplot/.noplots.`hostname`"
LF="/usr/common/status/rplot/.lock.`hostname`"
PF="/usr/common/status/rplot/.paper.`hostname`"

# If a plots.cj is already running, just quit

if [ -f $TF ]; then
        exit 2
fi

# Sun screen attributes
SCR_NORM="0m"
SCR_BOLD="1m"
SCR_UNDR="4m"
SCR_INV="7m"

BFREE=`df | grep /usr\$ | awk '{print $4}'`
INCHES=`cat $PF` echo "" > $TF
echo -n "${SCR_INV}`hostname` PLOT STATUS `date '+%a %h %d %T'` ($BFREE KBytes, $INCHES inches)$SCR_NORM" >> $TF if [ -f $LF ]; then
        echo "" >> $TF
        echo "" >> $TF
        echo -n "${SCR_BOLD}`cat $LF`" >> $TF
```

```
echo n `ps ax | grep vrplot | grep -v grep | grep -w -v csh | awk '{printf("%s(%s) for %s CPU Minutes",$3,$1,$4)}'` >> $TF
echo n `ps axw | grep n0 | grep -v grep | grep -v setenv | awk '{printf("%s(%s) for %s CPU Minutes",$3,$1,$4)}'` >> $TF
echo "$SCR_NORM" >> $TF
LINE=`ps ax | grep vrspool | grep -v grep | grep -w -v sh`
if [ x"$LINE" != x ]; then
        echo "${SCR_BOLD}Plotting `cat $LF | awk '{print $2}'` `echo $LINE | awk '{printf("%s(%s) for %s CPU Minutes",$3,$1,$
4)}'` $SCR_NORM" >> $TF
fi
else
        echo " ${SCR_BOLD}Ready${SCR_NORM}" >> $TF
fi if [ -f $HPF ]; then
        echo "$SCR_BOLD" >> $TF
        cat $HPF >> $TF
        echo "$SCR_NORM" >> $TF
fi if [ x"`/usr/ucb/lpq -P v42c | grep 'no entries'`" = x ]; then
        echo "" >> $TF
        echo -n "${SCR_UNDR}COLOR PLOTTER QUEUE:${SCR_NORM} " >> $TF
        /usr/ucb/lpq -Pv42c >> $TF
fi if [ x"`/usr/ucb/lpq -P v42bw | grep 'no entries'`" = x ]; then
        echo "" >> $TF
        echo -n "${SCR_UNDR}BK&WT PLOTTER QUEUE:${SCR_NORM} " >> $TF
        /usr/ucb/lpq -Pv42bw >> $TF
fi cp $TF $SF
rm -f $TF
```

Appendix D

```

# plots   Micron versatec plot status reporter
# 10/12/89/IdGore

# Copyright (C) 1990, Micron Technology, Inc. All Rights Reserved.

USAGE="usage: $0 [ -o | -m ]"
PLOTTER="v42c"
UPDATE="TRUE"
SPL_DIR="/usr/common/spool/v42"
STS_DIR="/usr/common/status/rplot"

case $# in
        0) ;;
        1) case $1 in
                "-o") UPDATE="ONCE";;
                "-m") UPDATE="FALSE";;
                *) echo $USAGE; exit 1
                esac;;
        *) echo $USAGE; exit 1;;
esac sun screen attributes
SCR_NORM="[0m"
SCR_BOLD="[1m"
SCR_UNDR="[4m"
SCR_INV="[7m"

# Handle ^C interrupt

trap 'UPDATE="FALSE"; LASTCMND="Cancelled continuous update"' 2 while test "TRUE"
do
        clear
        echo   "${SCR_INV}MICRON R&D VERSATEC PLOT STATUS `date`${SCR_NORM}"
        echo n "${SCR_UNDR}RASTER QUEUE:${SCR_NORM} "
        ls -l -r $SPL_DIR
        cat $STS_DIR/plots.*
        echo   "${SCR_BOLD}"
        if [ $UPDATE = "TRUE" ]; then
                echo -n "Updating every minute (^C for menu) ...${SCR_NORM} "
                sleep 60
        else
                if [ $UPDATE = "ONCE" ]; then
                        echo "$SCR_NORM"
                        exit 0
```

```
fi
echo $LASTCMND
echo -n "Select D)e-queue  P)aper  R)e-start  S)top  U)pdate  Q)uit:$(SCR_NORM) "
read sel
case $sel in
     [Dd])
             echo;
     echo -n "$(SCR_BOLD)Which queue (R=Raster, P=Plotter):$(SCR_NORM) "
     read Q
     echo;
     case $Q in
          [Rr])
             echo -n "$(SCR_UNDR)Jobs in raster queue:$(SCR_NORM) "
             ls -l -t -r $SPL_DIR
             echo -n "$(SCR_BOLD)Enter job to de-queue (RETURN to cancel):$(SCR_NORM) "
                     read JOB;
                     if [ x$JOB = x ]; then
                             LASTCMND="Cancelled de-queue."
                     else
                             echo -n "De-queing job $JOB in raster queue ... "
                             rm -f $SPL_DIR/$JOB
                             echo "done."
                             LASTCMND="De-queued $JOB"
                     fi;;
          [Pp])
                     echo -n "Which plot server (rndps1 or rndps2)...: "
                     read PSRVR
                     echo -n "Which plotter (v42c or v42bw)..........: "
                     read PLTR
                     echo -n "Enter job number from $PSRVR plot queue: "
                     read JOB
                     echo "$PLTR $JOB" > $STS_DIR/lprm.$PSRVR
                     chmod 666 $STS_DIR/lprm.$PSRVR
                     echo "One moment please."
                     rlogin $PSRVR -l start_v4
                     LASTCMND="De-queued job $JOB from $PLTR on $PSRVR";;
          *)
                     LASTCMND="Bad queue for de-queue";;
     esac;;
     [Pp])
             echo;
             PSRVR="bad";
             while [ x"$PSRVR" != xrndps1 -a x"$PSRVR" != xrndps2 ]
             do
                     echo -n "Adjust paper for which server (rndps1 or rndps2): "
                     read PSRVR
             done;
             echo "";
             PF="$STS_DIR/.paper.$PSRVR"
             INCHES="`cat $PF`"
             echo "$PSRVR has $INCHES inches of paper left.";
             echo "";
             echo -n "$PSRVR Select A)djust R)emove N)ew: "
             read VAR
             echo "";
             case $VAR in
                  [Aa])
                             echo -n "Enter new value in inches: ";
                             read INCHES;
                             echo -n "$INCHES" > $PF;
                             LASTCMND="Adjusted paper on $PSRVR to $INCHES inches";;
                  [Rr])
                             INCHES="`expr $INCHES - 36`";
                             echo -n "$INCHES" > $PF;
                             LASTCMND="Removed plots on $PSRVR";;
                  [Nn])
                             INCHES="5964";
                             echo -n "$INCHES" > $PF;
                             LASTCMND="Installed new paper on $PSRVR";;
                  *)
                             LASTCMND="Entered Bad paper command!";;
             esac;;
     [Rr])
             echo;
             echo -n "Start plotting on which server (rndps1 or rndps2): ";
             read PSRVR;
             echo "Re-starting plotting on $PSRVR...";
             rlogin $PSRVR -l start_v4
```

```
                LASTCMND="Re-started plotting on $PSRVR";;
    |ss|)
                echo;
                echo -n "Stop plotting on which server (rndps1 or rndps2): ";
                read PSRVR;
                echo "Stopping plotting on $PSRVR...";
                rlogin $PSRVR -l stop_v42
                LASTCMND="Stopped plotting on $PSRVR";;
    |u|)
                if [ `hostname` = "rndps1" -o `hostname` = "rndps2" ]; then
                    clear;
                    echo "Micron Technology Inc. Research & Development Workstation Network";
                fi;
                exit;;
    |Uu|)
                UPDATE "TRUE";;
    "")
                ;;
    *)
                LASTCMND="Entered invalid selection!!!";;
                esac
            fi
    done
```

We claim:

1. A system for the design, layout and plotting of integrated circuits, comprising:
 a client workstation including a graphical display means and means for creating integrated circuit layout design data;
 a first programmable computer including a means operable to function as a file server;
 a second programmable computer including a means operable to function as a plot server;
 plotting means connected to the plot server for plotting graphic images including integrated circuit layouts; and
 computer network means for interconnecting the workstation and the first and second computers to transmit data therebetween;
 the workstation, file server and plot server each having a memory, a processor, a network interface, and an input means including a user-operable means for entering data;
 means for generating a design file plot template referencing the layout design data;
 means for transferring the design file plot template to the plot server;
 means for generating plot output in the plot server in accordance with the design file plot template; and
 means for transferring the plot output to the plotting means to print an integrated circuit layout therefrom.

2. A system according to claim 1 in which the means for generating plot output includes means for queuing the data for rasterization, means for rasterizing the data into an output image, and means for spooling the output image to the plotting means.

3. A system according to claim 1 in which the means for generating a design file plot template includes:
 a first graphical display means for creating design file plot template data;
 means for collecting, storing, and retrieving the data;
 means for altering previously collected design file plot template data; and
 a second graphical display means for submitting the data for subsequent transfer to a plot server.

4. A system according to claim 3 in which the first graphical display means includes:
 a display oriented data fill form containing a menu of plot options;
 a graphical means for selecting and adjusting said plot options; and
 the second graphical means being operative to submit the resulting options as a design file plot template for further processing.

5. A system according to claim 1 including a third programmable computer coupled to the plot server configured to function as a raster server; the raster server including a means for rasterizing the data.

6. A system according to claim 1 in which the plot server includes means for rasterizing the data, and means for submitting the rasterized data to the plotting means for hardcopy output.

7. A system according to claim 6 in which the means for submitting the rasterized data to the plotting means for hardcopy output includes means for periodically inspecting a raster queue for the existence of one or more design file plot templates awaiting rasterization.

8. A system according to claim 7 further comprising:
 a means for supporting at least two plotting devices;
 a means for sequencing multiple plotting devices such that no two plotters ever attempt to retrieve the same design file plot template from the raster queue; and
 a means for monitoring the progress of plotting of said rasterized design file plot templates.

9. A system according to claim 8 in which the means for monitoring the progress of plotting includes:
 a means for periodically or continuously monitoring the progress of design file plot templates in the raster and plotting queues;
 a means for stopping and restarting plotting; and
 a means for reordering the plotter queue.

10. A system for the design, layout and plotting of integrated circuits, comprising:
 a client workstation including a graphical display means and means for creating integrated circuit layout design data;
 a first programmable computer including a means operable to function as a file server;
 a second programmable computer including a means operable to function as a plot server;
 plotting means connected to the plot server for plotting graphic images including integrated circuit layouts; and
 computer network means for interconnecting the workstation and the first and second computers to transmit data therebetween;

the workstation, file server and plot server each having a memory, a processor, a network interface, and an input means including a user-operable means for entering data;

the workstation including means for generating a design file plot template referencing the layout design data, and a second means for transferring the design file plot template to the file server;

the file server including means for storing design data and design file plot templates, and a second means for queuing design file plot templates in a raster queue;

the plot server including means for accessing the raster queue and retrieving a next template present therein; means responsive to a reference in the retrieved design file plot template for retrieving corresponding design data; and means for rasterizing the retrieved design data pursuant to the retrieved design file plot template.

11. A method for remote plotting of an integrated circuit layout in an integrated circuit design and layout system which includes a client workstation with a graphical display means, a plotting device for plotting graphical data including integrated circuit layouts, the workstation having a memory, a processor, a network interface, and an input means including a user-operable means for entering data; the method comprising:

providing a first programmable computer including means operable to function as a file or data base server, providing a second programmable computer including means operable to function as a plot server, the plot server including a means for generating plot output;

interconnecting the client workstation, file server, and plot server via a computer network and connecting the plotting device to the plot server;

creating integrated circuit layout design data in the client workstation and storing said data in the file server;

creating a design file plot template in the client workstation;

transferring both the design data from the file server, and the design file plot template from the client workstation to the plot server;

rasterizing the design data in the plot server according to the design file plot template to produce a rasterized image of the integrated circuit layout; and transmitting the rasterized image to the plotting device and printing the image of the integrated circuit layout on said plotting device.

12. A method according to claim 11 in which the interconnecting step includes providing a remote file access system whereby said client workstation, said file server, and said plot server each have access to the memory on all computers in said network.

13. A method according to claim 11 in which the transferring step includes the plot server periodically inspecting a raster queue for the existence of design file plot templates which reference design data awaiting rasterization.

14. A method according to claim 13 in which the periodic inspection step further comprises supporting multiple plot servers on a network and sequencing their operation such that no two plot servers can retrieve the same design file plot template from a common raster queue in the file server, thereby facilitating the staging of multiple plot servers and multiple plotting devices.

15. A method according to claim 11 in which the transmitting and printing steps include monitoring plotting device status, progress of a raster queue, and progress of plots being spooled to the plotting device.

16. A method according to claim 11 in which creating a plot output characteristics description includes creating a design file plot template in the workstation which references design data and specifies plotting instructions to control the characteristics of the desired output.

17. A method according to claim 16 in which the creating a design file plot template step further comprises:

creating a screen oriented fill form;

providing a selection service mechanism to facilitate graphically selecting, setting, and adjusting plot template options;

creating a screen oriented confirmation form; and providing a selection service mechanism to facilitate graphically confirming the design file plot template options and submitting the plot template for further processing.

18. A method according to claim 16 in which the creating a design file plot template step comprises retrieving an existing design file plot template for alteration and/or subsequent submission.

19. A method according to claim 11 in which the creating a design file plot template in the client workstation step enables the client workstation user to continue capturing design data without loss of response time from the client workstation processor.

* * * * *